US011886329B2

(12) United States Patent
Gardner et al.

(10) Patent No.: US 11,886,329 B2
(45) Date of Patent: Jan. 30, 2024

(54) AUTOMATED MACHINE LEARNING TEST SYSTEM

(71) Applicant: SAS Institute Inc., Cary, NC (US)

(72) Inventors: Steven Joseph Gardner, Cary, NC (US); Connie Stout Dunbar, Wake Forest, NC (US); David Bruce Elsheimer, Clayton, NC (US); Gregory Scott Dunbar, Wake Forest, NC (US); Joshua David Griffin, Harrisburg, NC (US); Yan Gao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/840,745

(22) Filed: Jun. 15, 2022

(65) Prior Publication Data

US 2022/0308989 A1 Sep. 29, 2022

Related U.S. Application Data

(63) Continuation-in-part of application No. 17/523,607, filed on Nov. 10, 2021, now Pat. No. 11,775,878.
(Continued)

(51) Int. Cl.
G06F 11/36 (2006.01)

(52) U.S. Cl.
CPC ...... *G06F 11/3684* (2013.01); *G06F 11/3688* (2013.01)

(58) Field of Classification Search
CPC .................. G06F 11/3684; G06F 11/3688
See application file for complete search history.

(56) References Cited

U.S. PATENT DOCUMENTS

| 6,567,924 B1 * | 5/2003 | McGee | G06F 11/3688 |
| | | | 713/502 |
| 7,809,988 B1 * | 10/2010 | Portal | G06Q 10/06 |
| | | | 714/37 |

(Continued)

FOREIGN PATENT DOCUMENTS

| CN | 104572462 B | * | 10/2017 | |
| CN | 110377492 A | * | 10/2019 | .......... G06F 11/3684 |

(Continued)

OTHER PUBLICATIONS

Nasser, Abdullah B., et al. "Latin Hypercube Sampling Jaya Algorithm based Strategy for T-way Test Suite Generation." Proceedings of the 2020 9th International Conference on Software and Computer Applications. (Year: 2020).*

(Continued)

*Primary Examiner* — Michael J Huntley
*Assistant Examiner* — Adam C Standke
(74) *Attorney, Agent, or Firm* — Bell & Manning, LLC

(57) ABSTRACT

A computing device selects new test configurations for testing software. (A) First test configurations are generated using a random seed value. (B) Software under test is executed with the first test configurations to generate a test result for each. (C) Second test configurations are generated from the first test configurations and the test results generated for each. (D) The software under test is executed with the second test configurations to generate the test result for each. (E) When a restart is triggered based on a distance metric value computed between the second test configurations, a next random seed value is selected as the random seed value and (A) through (E) are repeated. (F) When the restart is not triggered, (C) through (F) are repeated until a stop criterion is satisfied. (G) When the stop criterion is satisfied, the test result is output for each test configuration.

30 Claims, 22 Drawing Sheets

Related U.S. Application Data

(60) Provisional application No. 63/313,457, filed on Feb. 24, 2022, provisional application No. 63/309,963, filed on Feb. 14, 2022, provisional application No. 63/128,855, filed on Dec. 22, 2020.

(56) References Cited

U.S. PATENT DOCUMENTS

| | | | |
|---|---|---|---|
| 8,276,123 B1* | 9/2012 | Deng | G06F 11/368 717/124 |
| 2019/0065182 A1 | 2/2019 | Hsiung et al. | |
| 2022/0198340 A1 | 6/2022 | Gao et al. | |

FOREIGN PATENT DOCUMENTS

| | | |
|---|---|---|
| DE | 102019210562 A1 | 1/2021 |
| WO | WO 2018/162048 | 9/2018 |

OTHER PUBLICATIONS

Stratis, Panagiotis et al. "Speeding up test execution with increased cache locality." Software Testing, Verification and Reliability 28.5 (Year: 2018).*

Bahaweres, Rizal Broer, et al. "Analysis of statement branch and loop coverage in software testing with genetic algorithm." 2017 4th International Conference on Electrical Engineering, Computer Science and Informatics (EECSI). IEEE (Year: 2017).*

Khamprapai, Wanida, et al. "Analyzing the Performance of the Multiple-Searching Genetic Algorithm to Generate Test Cases." Applied Sciences 10.20 (Year: 2020).*

Chan, Kwok Ping, T. Y. Chen, and Dave Towey. "Forgetting test cases." 30th Annual International Computer Software and Applications Conference (COMPSAC'06). vol. 1. IEEE, 2006 (Year: 2006).*

Mao et al. "Out of sight, out of mind: a distance-aware forgetting strategy for adaptive random testing." Science China Information Sciences 60 (2017)("Mao") (Year: 2017).*

Shamshiri, Sina, et al. "Random or genetic algorithm search for object-oriented test suite generation?." Proceedings of the 2015 annual conference on genetic and evolutionary computation. (Year: 2015).*

Chan, Kwok Ping, T. Y. Chen, and Dave Towey. "Forgetting test cases." 30th Annual International Computer Software and Applications Conference (COMPSAC'06). vol. 1. IEEE (Year: 2006).*

Mao et al. "Out of sight, out of mind: a distance-aware forgetting strategy for adaptive random testing." Science China Information Sciences 60 (Year: 2017).*

Zhu, H., & Bayley, I. (Oct. 2020). Exploratory datamorphic testing of classification applications. In Proceedings of the IEEE/ACM 1st International Conference on Automation of Software Test (pp. 51-60) (Year: 2020).*

Groce, Alex, et al. "You are the only possible oracle: Effective test selection for end users of interactive machine learning systems." *IEEE Transactions on Software Engineering* 40.3 (2013): 307-323.

Gray, Genetha Anne, et al. An Asynchronous Parallel Hybrid Optimization Approach to Simulation-Based Mixed-Integer Nonlinear Problems. No. SAND2011-3474C. Sandia National Lab.(SNL-CA), Livermore, CA (United States), 2011.

SAS Institute Inc. 2020. SAS® Optimization: Mathematical Optimization Programming Guide. Cary, NC: SAS Institute Inc.

SAS Institute Inc. 2019. SAS® Optimization 8.5: Mathematical Optimization Programming Guide. Cary, NC: SAS Institute Inc.

Hutter, Frank, Holger Hoos, and Kevin Leyton-Brown. "An efficient approach for assessing hyperparameter importance." International conference on machine learning. PMLR, 2014.

Hughes, Ed, et al. Paper SAS4494-2020. The New solveBlackbox Action in SAS® Optimization 8.5. Cary, NC: SAS Institute Inc.

Tantithamthavorn, Chakkrit, et al. "The impact of automated parameter optimization on defect prediction models." IEEE Transactions on Software Engineering 45.7 (Jul. 2019): 683-711.

Hughes, Ed, et al. Paper SAS4494-2020. The New solveBlackbox Action in SAS® Optimization 8.5. Cary, NC: SAS Institute Inc. (2020).

* cited by examiner

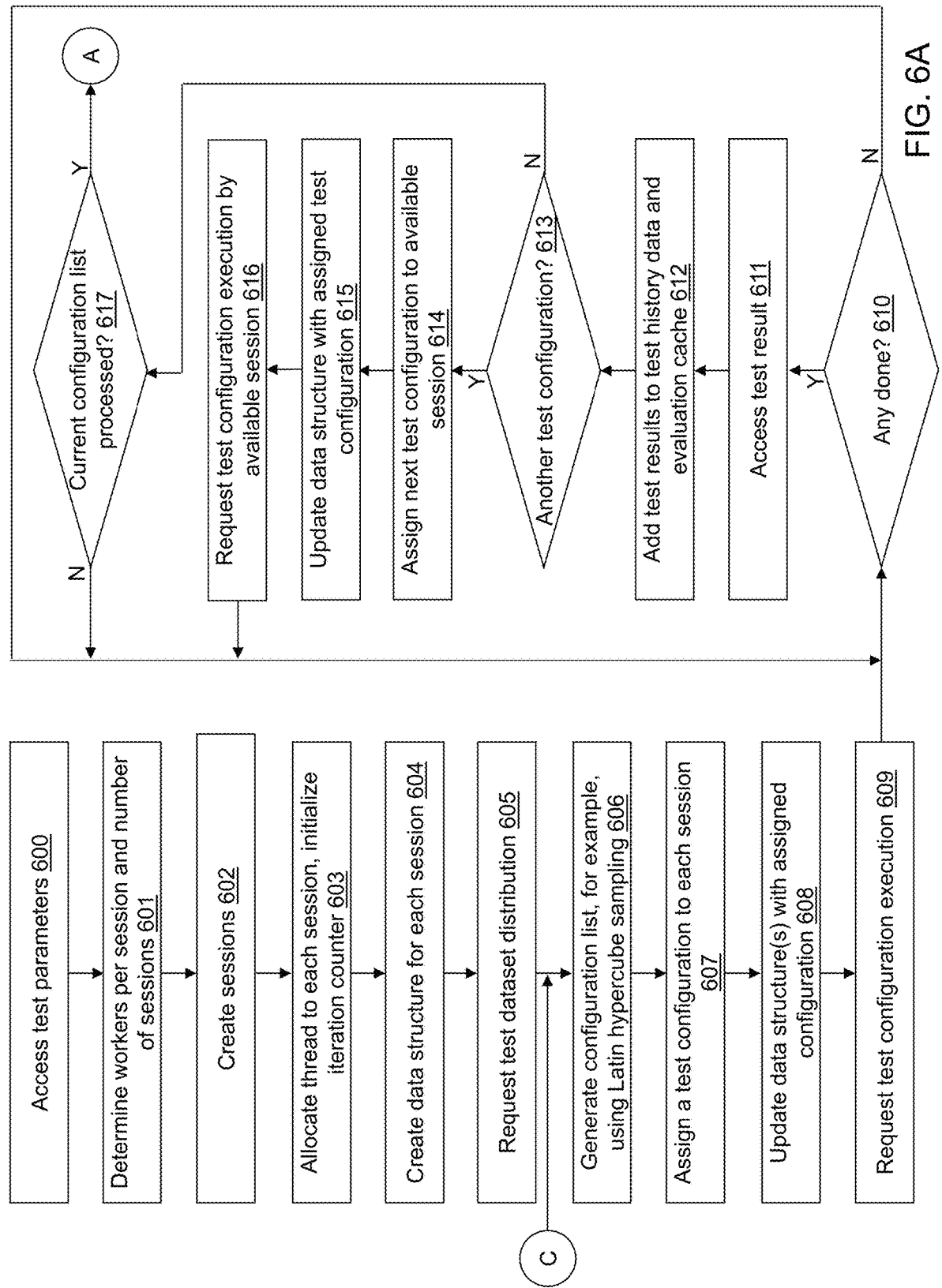

AUTOMATED MACHINE LEARNING TEST SYSTEM

CROSS-REFERENCE TO RELATED APPLICATIONS

The present application claims the benefit of and priority under 35 U.S.C. § 119(e) to U.S. Provisional Patent Application No. 63/309,963 filed Feb. 14, 2022 and to U.S. Provisional Patent Application No. 63/313,457 filed Feb. 24, 2022, the entire contents of which are hereby incorporated by reference. The present application is also a continuation-in-part of U.S. patent application Ser. No. 17/523,607 that was filed Nov. 10, 2021, the entire contents of which are hereby incorporated by reference. U.S. patent application Ser. No. 17/523,607 claims the benefit of and priority under 35 U.S.C. § 119(e) to U.S. Provisional Patent Application No. 63/128,855 filed Dec. 22, 2020, the entire contents of which are hereby incorporated by reference.

BACKGROUND

Machine learning involves self-calibration of predictive models that are built from training data and commonly used to find hidden value in big data. Facilitating effective decision making often requires the transformation of relevant data to high-quality descriptive and predictive models. The transformation presents several challenges however. Different test parameters are used based on the type of predictive model. Not only do the input values used for the test parameters dictate the performance of the training process, but more importantly they govern the quality of the resulting predictive models.

Testing of various software components, algorithms, simulation, etc., including trained predictive models, is performed to identify any errors and/or any performance degradation issues by executing the software using various values to inputs to the software including different datasets, where applicable. For guidance in defining the test configurations that include various combinations of test parameter values, testers often rely on their past experience using the software. However, it is difficult to define a broad range of test configurations based on previous experience. There is further an inherent expense in testing the software to evaluate many different test configurations in terms of computing resources, computing time, and user time.

SUMMARY

In an example embodiment, a non-transitory computer-readable medium is provided having stored thereon computer-readable instructions that when executed by a computing device, cause the computing device to automatically select new test configurations for testing software. (A) A first plurality of test configurations is generated using a random seed value. Each test configuration of the first plurality of test configurations includes a value for each test parameter of the plurality of test parameters. Each test parameter of the plurality of test parameters is an input to software under test. (B) The software under test is executed with the generated first plurality of test configurations to generate a test result for each test configuration of the first plurality of test configurations. (C) A second plurality of test configurations is generated from the first plurality of test configurations and the test results generated for each test configuration of the first plurality of test configurations. (D) The software under test is executed with the generated second plurality of test configurations to generate the test result for each test configuration of the generated second plurality of test configurations. (E) When a restart is triggered based on a distance metric value computed between the generated second plurality of test configurations, a next random seed value is selected as the random seed value and (A) through (E) are repeated. The next random seed value is different from the random seed value used in any previous iteration of (A) through (E). (F) When the restart is not triggered based on the distance metric value computed using the generated second plurality of test configurations, (C) through (F) are repeated until a stop criterion is satisfied. (G) When the stop criterion is satisfied, the generated test result is output for each test configuration generated in (A) and (C).

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to automatically select new test configurations for testing software.

In yet another example embodiment, a method of automatically selecting new test configurations for testing software is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 6A through 6D depict a flow diagram illustrating examples of operations performed by the test manager device of FIG. 3 in accordance with an illustrative embodiment.

DETAILED DESCRIPTION

Figure 1:
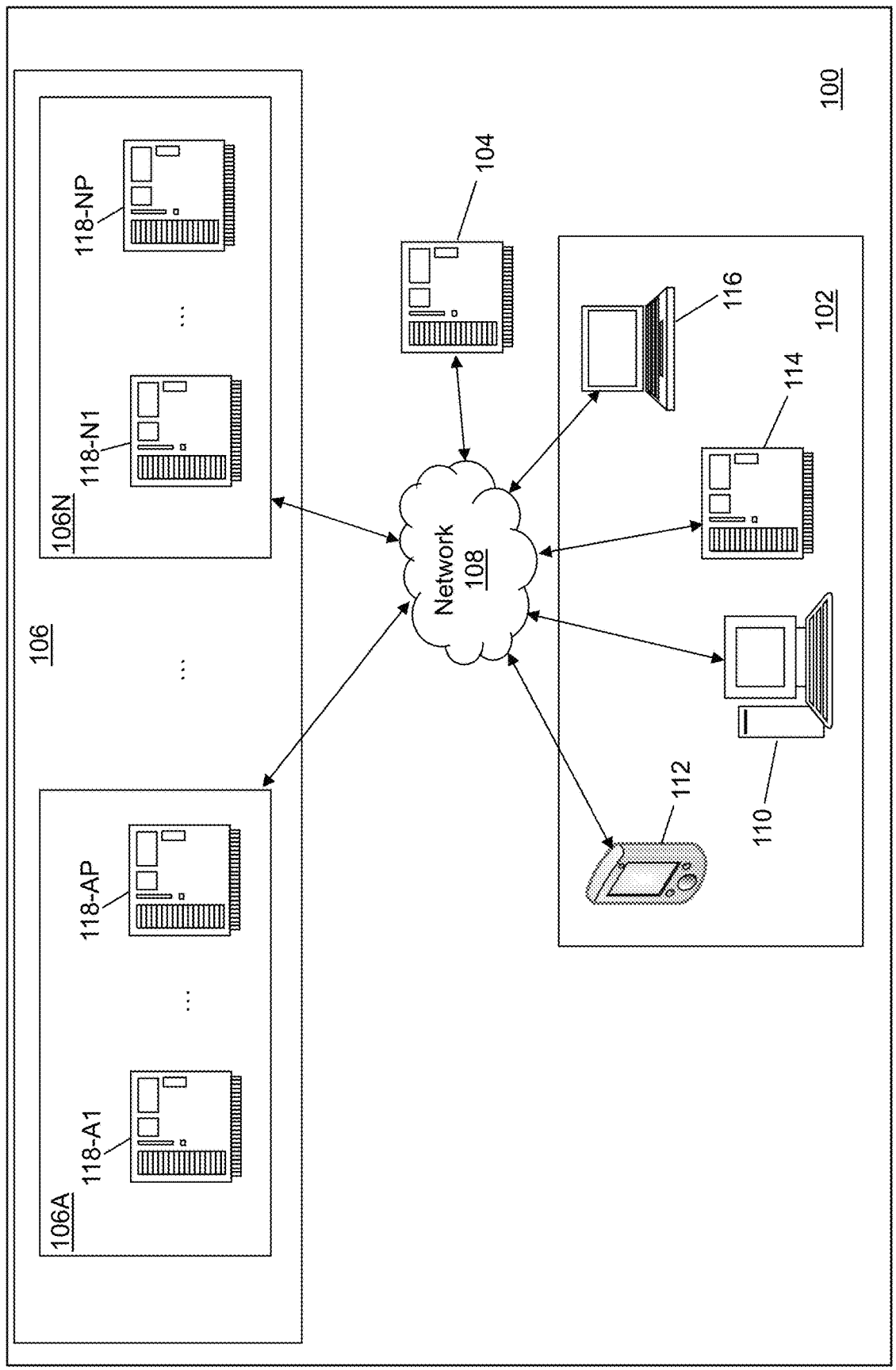
FIG. 1 depicts a block diagram of a test system in accordance with an illustrative embodiment.

Referring to FIG. 1, a block diagram of a test system 100 is shown in accordance with an illustrative embodiment. Test system 100 provides an automated test system that achieves one or more test objectives efficiently and effectively. Test system 100 draws test samples randomly from given distributions, executes tests in parallel to collect test evaluation historic data, and builds models with the test evaluation historic data to optimize the test generation process and drive tests to better achieve test objectives faster.

Test system 100 can be used as a smart engine for regression tests. Test system 100 randomly selects a number of test configurations as initial test configurations, executes the test configurations in parallel to collect test evaluation historic data, selects a next set of test configurations based on the test configuration results, executes the next set of test configurations in parallel to collect additional test evaluation historic data, and so on until stopping criteria is met. During the test configuration executions, the process may be restarted when the next set of test configurations is determined to be collapsing to configurations that are close to each other. The random selection of the initial test configurations and the random selections after a determination to restart may be determined using Latin hypercube sampling (LHS) where the LHS selected samples are selected to fill the search space in a more random manner throughout the search space than when using existing methods that fill the search space in a uniform manner throughout the search space. When each test configuration includes a nominal variable, a value for the nominal variable may be selected randomly to provide a more equal distribution of the selected values for the nominal variable instead of collapsing around a single value or small set of values. A nominal variable may also be referred to as a categorical variable that includes a number of distinct values. For example, hair color may be a nominal variable with discrete values that represent, black, brown, blonde, red, etc.

In an illustrative embodiment, test system 100 may include a user system 102, a test manager device 104, a worker system 106, and a network 108. Each of user system 102, test manager device 104, and worker system 106 may be composed of one or more discrete computing devices in communication through network 108. Alternatively, user system 102, test manager device 104, and worker system 106 may be integrated into a single computing device capable of computing using a plurality of threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from test manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
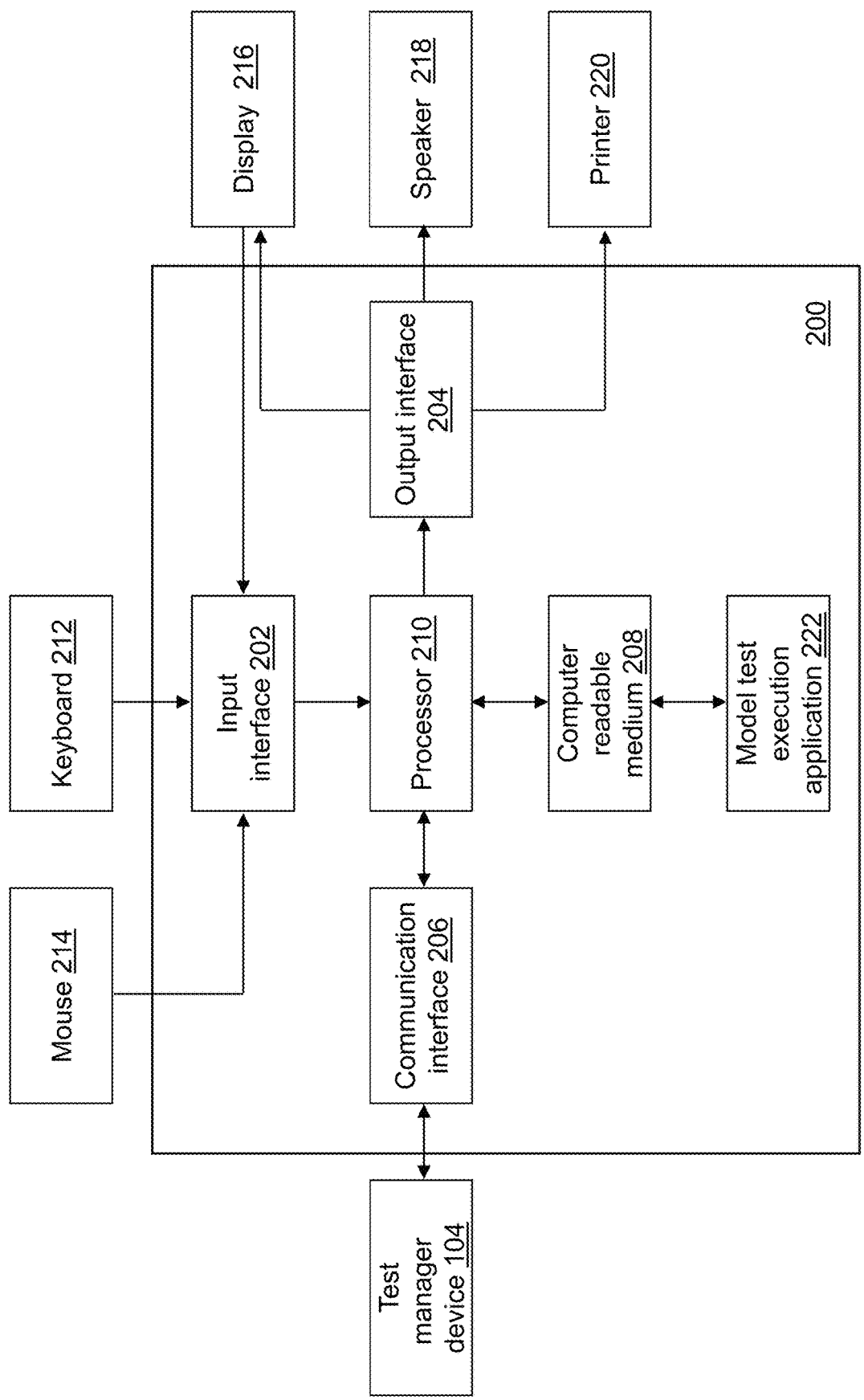
FIG. 2 depicts a block diagram of a user device of the test system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, and a model test execution application 222. Each computing device of user system 102 may be executing model test execution application 222 of the same or different type.

Referring again to FIG. 1, test manager device 104 can include any form factor of computing device. For illustration, FIG. 1 represents test manager device 104 as a server computer. Test manager device 104 may send and receive signals through network 108 to/from user system 102 and/or to/from worker system 106. Test manager device 104 may communicate using various transmission media that may be wired and/or wireless as understood by those skilled in the art. Test manager device 104 may be implemented on a plurality of computing devices of the same or different type. Test system 100 further may include a plurality of test manager devices. User device 200 and test manager device 104 may be implemented in the same computing device using one or more threads.

Figure 3:
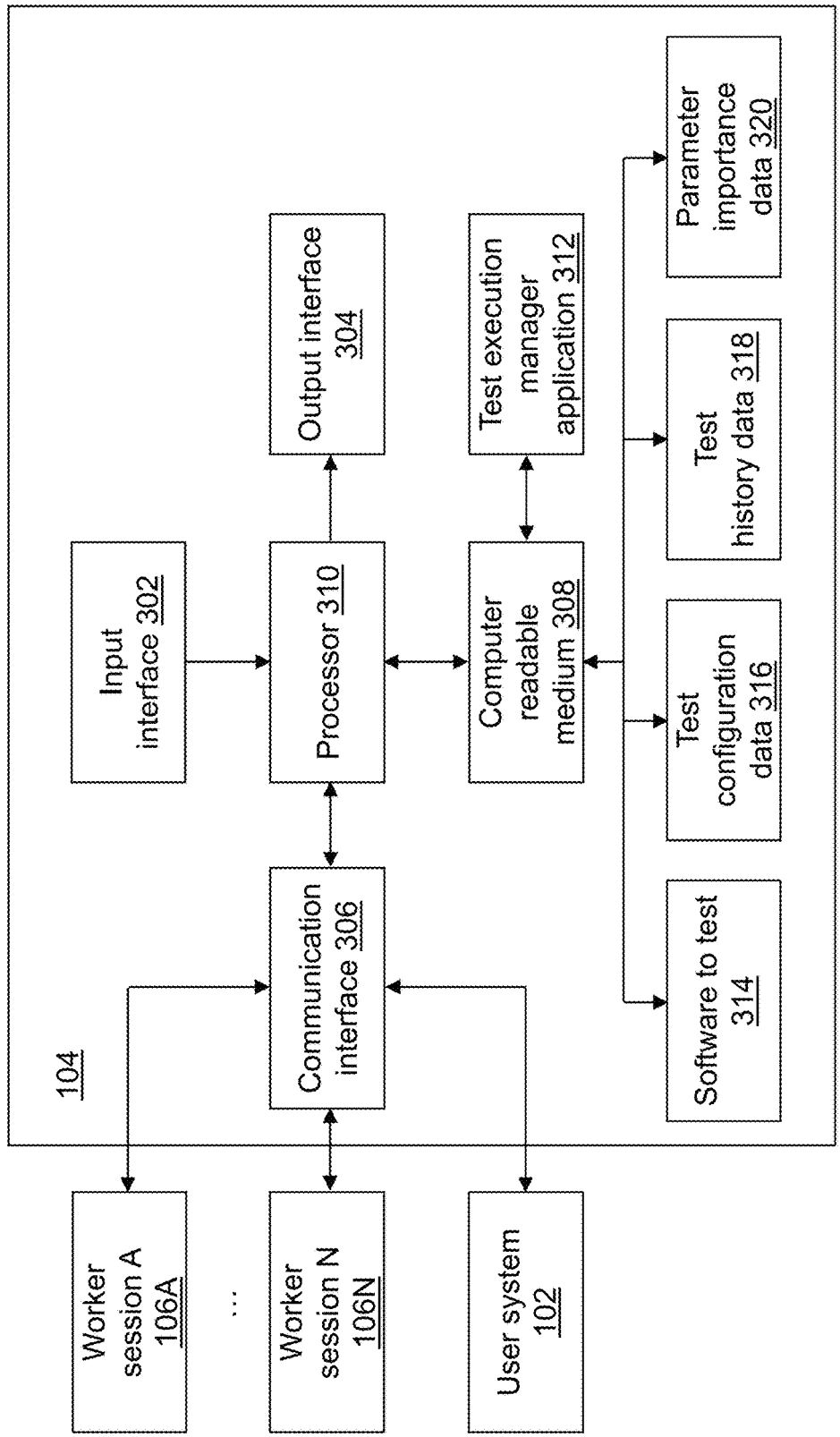
FIG. 3 depicts a block diagram of a test manager device of the test system of FIG. 1 in accordance with an illustrative embodiment.

For illustration, referring to FIG. 3, a block diagram of test manager device 104 is shown in accordance with an illustrative embodiment. Test manager device 104 may include a second input interface 302, a second output interface 304, a second communication interface 306, a second computer-readable medium 308, a second processor 310, a test execution manager application 312, a software to test 314, test configuration data 316, test history data 318, and parameter importance data 320. Test manager device 104 may execute test execution manager application 312 to define test configuration data 316, to control execution of the software being tested that is stored in software to test 314, to store the test execution results in test history data 318, and/or to determine a parameter importance of each test parameter that is stored in parameter importance data 320. Worker system 106 executes the software being tested and returns the test execution results to test manager device 104.

Referring again to FIG. 1, the one or more computing devices of worker system 106 may include computers of any form factor that may be organized into one or more sessions, where a number of the one or more sessions is indicated by N. Worker system 106 may include a number of computing devices indicated by W. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session 106A, . . . , and an Nth worker session 106N. Each session may include one or more computing devices, where a number of session computing devices in each session is indicated by P. In the illustrative embodiment, first worker session 106A may include a first computing device 118-A1, . . . , and a Pth computing device 118-AP, and Nth worker session 106N may include a first computing device 118-N1, . . . , and a Pth computing device 118-NP. The number of computing devices indicated by W may or may not also include test manager device 104. A number of threads may be associated with each computing device of worker system 106.

The computing devices of worker system 106 may send and receive signals through network 108 to/from test manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
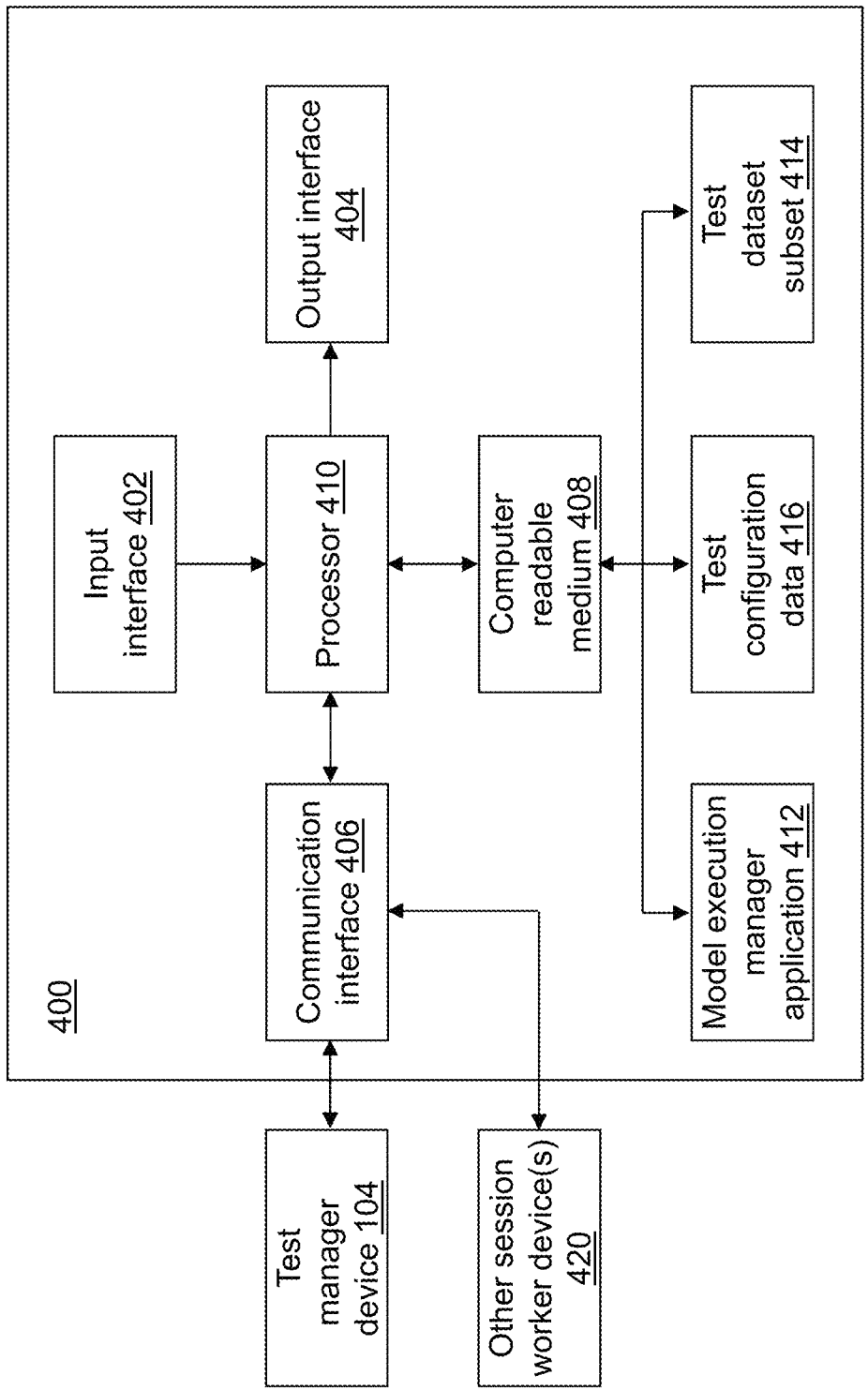
FIG. 4A depicts a block diagram of a session manager device of the test system of FIG. 1 in accordance with an illustrative embodiment.

For illustration, referring to FIG. 4A, a block diagram of a session manager device 400 is shown in accordance with an example embodiment. Session manager device 400 is an example computing device of each session of worker system 106. For example, a first computing device of each session, such as first computing device 118-A1 of first worker session 106A and first computing device 118-N1 of Nth worker session 106N, may be an instance of session manager device 400. Session manager device 400 may include a third input interface 402, a third output interface 404, a third communication interface 406, a third computer-readable medium 408, a third processor 410, a model execution manager application 412, a first test dataset subset 414, and test configuration data 416.

Figure 4B:
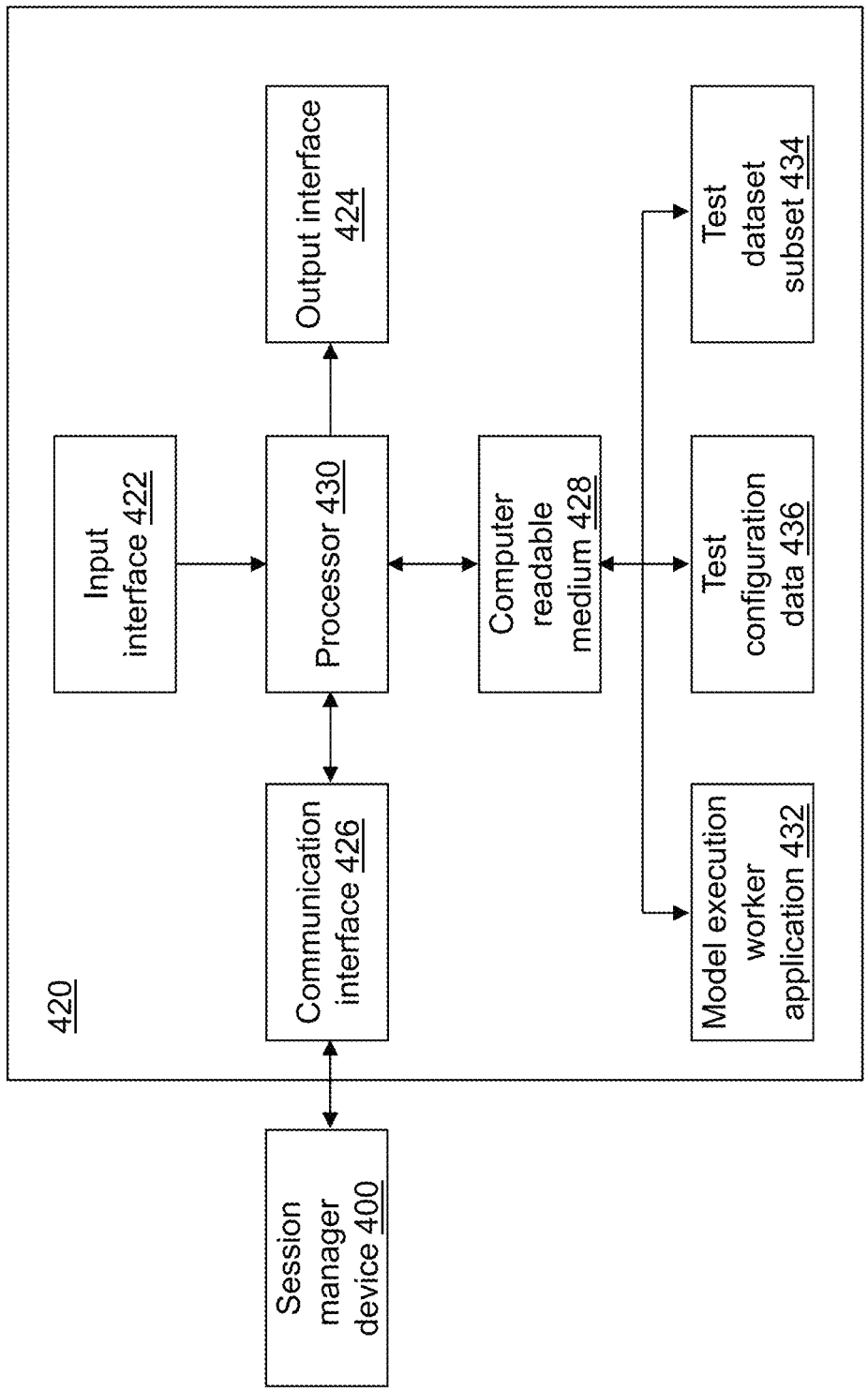
FIG. 4B depicts a block diagram of a session worker device of the test system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106. For example, remaining computing devices of each session, if any, such as . . . , and Pth computing device 118-AP of first worker session 106A and . . . , and Pth computing device 118-NP of nth worker session 106N, may each be an instance of session worker device 420. Session worker device 420 may include a fourth input interface 422, a fourth output interface 424, a fourth communication interface 426, a fourth computer-readable medium 428, a fourth processor 430, a model execution worker application 432, a test dataset subset 434, and test configuration data 436.

Because the test dataset may need to be distributed across a plurality of computing devices due to its size, each session may include a plurality of computing devices with one of the computing devices acting as the session manager and referred to as session manager device 400. The test dataset may be distributed into data subsets at each computing device included in the respective session, with each session distributing the test dataset in a similar manner among its computing devices. For example, if first worker session 106A includes three computing devices, approximately a third of the test dataset is distributed to each computing device of first worker session 106A that may or may not include a first session manager device 400A of first worker session 106A depending on whether first session manager device 400A includes itself as a session worker computing device. Session manager device 400 of Nth worker session 106N similarly distributes the test dataset among the computing devices of Nth worker session 106N. First test dataset subset 414 may be created at session manager device 400 or at a first worker computing device of each worker session depending on whether session manager device 400 is using itself as a worker device. Thus, session manager device 400 may coordinate the distribution with or without storing a portion of the test dataset in test dataset subset 414. Test manager device 104 and session manager device 400 may be implemented in the same computing device using one or more threads.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and test manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of RAM, any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Model test execution application 222 performs operations associated with initiating a testing process on software to test 314. The operations may be implemented using hardware, firmware, software, or any combination of these methods. Referring to the example embodiment of FIG. 2, model test execution application 222 is implemented in software (comprised of computer-readable and/or computer-executable instructions) stored in computer-readable medium 208 and accessible by processor 210 for execution of the instructions that embody the operations of model test execution application 222. Model test execution application 222 may be written using one or more programming languages, assembly languages, scripting languages, etc.

Model test execution application 222 may be implemented as a Web application. For example, model test execution application 222 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Model test execution application 222 may be integrated with other analytic tools. As an example, model test execution application 222 may be part of an integrated data analytics software application and/or software architecture such as that offered by SAS Institute Inc. of Cary, North Carolina, USA. For example, model test execution application 222 may be part of SAS® Enterprise Miner™ and/or SAS® Viya™ developed and provided by SAS Institute Inc. of Cary, North Carolina, USA that may be used to test CAS actions, SAS procedures, macros or user-defined CAS actions developed by SAS users based on running many tests driven by advanced algorithms to improve test coverage and speed up testing. Merely for further illustration, model test execution application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, and SAS® Forecast Server, all of which are developed and provided by SAS Institute Inc. of Cary, North Carolina, USA. Data mining is applicable in a wide variety of industries.

Referring again to FIG. 3, fewer, different, or additional components may be incorporated into test manager device 104. Second input interface 302 provides the same or similar functionality as that described with reference to input interface 202 of user device 200 though referring to test manager device 104. Second output interface 304 provides the same or similar functionality as that described with reference to output interface 204 of user device 200 though referring to test manager device 104. Second communication interface 306 provides the same or similar functionality as that described with reference to communication interface 206 of user device 200 though referring to test manager device 104. Data and messages may be transferred between test manager device 104 and/or user device 200 and session manager device 400 using second communication interface 306. Second computer-readable medium 308 provides the same or similar functionality as that described with reference to computer-readable medium 208 of user device 200 though referring to test manager device 104. Second processor 310 provides the same or similar functionality as that described with reference to processor 210 of user device 200 though referring to test manager device 104.

Test execution manager application 312 performs operations associated with defining one or more sets of test configurations to execute as inputs to software to test 314 based on inputs provided from user device 200. Test execution manager application 312 requests that the computing devices of worker system 106 execute a test of software to test 314 for each test configuration in the defined one or more sets of test configurations. The operations may be implemented using hardware, firmware, software, or any combination of these methods. Referring to the example embodiment of FIG. 3, test execution manager application 312 is implemented in software (comprised of computer-readable and/or computer-executable instructions) stored in second computer-readable medium 308 and accessible by second processor 310 for execution of the instructions that embody the operations of test execution manager application 312. Test execution manager application 312 may be written using one or more programming languages, assembly languages, scripting languages, etc. Test execution manager application 312 may be implemented as a Web application. Similar to model test execution application 222, test execution manager application 312 may be integrated with other analytic tools.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or test manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Model execution manager application 412 performs operations associated with coordinating execution of software to test 314 by an associated session based on inputs provided from test manager device 104. The operations may be implemented using hardware, firmware, software, or any combination of these methods. Referring to the example embodiment of FIG. 4A, model execution manager application 412 is implemented in software (comprised of computer-readable and/or computer-executable instructions) stored in third computer-readable medium 408 and accessible by third processor 410 for execution of the instructions that embody the operations of model execution manager application 412. Model execution manager application 412 may be written using one or more programming languages, assembly languages, scripting languages, etc. Model execution manager application 412 may be implemented as a Web application. Similar to model test execution application 222, model execution manager application 412 may be integrated with other analytic tools.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model execution worker application 432 performs operations associated with executing software to test 314 using test dataset subset 434 and test configuration data 436 provided by session manager device 400. When session manager device 400 is also a session worker computing device, session manager device 400 also performs the operations of model execution worker application 432 using test dataset subset 414 and test configuration data 416. The operations may be implemented using hardware, firmware, software, or any combination of these methods. Referring to the example embodiment of FIG. 4B, model execution worker application 432 is implemented in software (comprised of computer-readable and/or computer-executable instructions) stored in fourth computer-readable medium 428 and accessible by fourth processor 430 for execution of the instructions that embody the operations of model execution worker application 432. Model execution worker application 432 may be written using one or more programming languages, assembly languages, scripting languages, etc. Model execution worker application 432 may be implemented as a Web application. Similar to model test execution application 222, model execution worker application 432 may be integrated with other analytic tools.

Model test execution application 222, test execution manager application 312, model execution manager application 412, and/or model execution worker application 432 may be the same or different applications that are integrated in various manners to define one or more sets of test configurations, select each test configuration, and execute software to test 314 using test dataset subset 434 and/or test dataset subset 414 and test configuration data 436 and/or test configuration data 416 on a single computing device or on a plurality of computing devices.

The test dataset may include, for example, a plurality of rows and a plurality of columns. The plurality of rows may be referred to as observation vectors or records (observations), and the columns may be referred to as variables. The test dataset may be transposed. The plurality of variables may define multiple dimensions for each observation vector. An observation vector $x_i$ may include a value for each of the plurality of variables associated with the observation i.

The test dataset may be stored on computer-readable medium 208, on second computer-readable medium 308, on third computer-readable medium 408, and/or on fourth computer-readable medium 428, and/or on one or more computer-readable media accessible by model execution manager application 412 using third communication interface 406 and/or third input interface 402 or accessible by model execution worker application 432 using fourth communication interface 426 and/or fourth input interface 422.

Data stored in the test dataset may be sensor measurements or signal values captured by a sensor such as a camera, may be generated or captured in response to occurrence of an event or a transaction, generated by a device such as in response to an interaction by a user with the device, etc. The data stored in the test dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the test dataset may be captured at different time points periodically, intermittently, when an event occurs, etc. One or more columns of the test dataset may include a time and/or date value.

The test dataset may include data captured under normal operating conditions of the physical object. The test dataset may include data captured at a high data rate such as 200 or more observations per second for one or more physical objects. For example, data stored in the test dataset may be generated as part of the Internet of Things (IoT), where things (e.g., machines, devices, phones, sensors) can be connected to networks and the data from these things collected and processed within the things and/or external to the things before being stored in the test dataset. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE) that may reside in the cloud or in an edge device before being stored in the test dataset.

The test dataset may be stored using various structures as known to those skilled in the art including one or more files of a file system, a relational database, one or more tables of a system of tables, a structured query language database, etc. Each session manager device 400 may coordinate access to the test dataset that is distributed across the session worker devices of the associated session that may include zero or more session worker devices. For example, the test dataset may be stored in a cube distributed across the computing devices of each session that is a grid of computers as understood by a person of skill in the art. As another example, the test dataset may be stored across the computing devices of each session that form a multi-node Hadoop® cluster. For instance, Apache™ Hadoop® is an open-source software framework for distributed computing supported by the Apache Software Foundation. As another example, the test dataset may be stored across the computing devices of each session that form a cloud of computers and may be accessed using cloud computing technologies, as understood by a person of skill in the art. The SAS® LASR™ Analytic Server may be used as an analytic platform to enable multiple users to concurrently access data stored in the test dataset. The SAS® Viya™ open, cloud-ready, in-memory architecture also may be used as an analytic platform to enable multiple users to concurrently access data stored in the test dataset. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
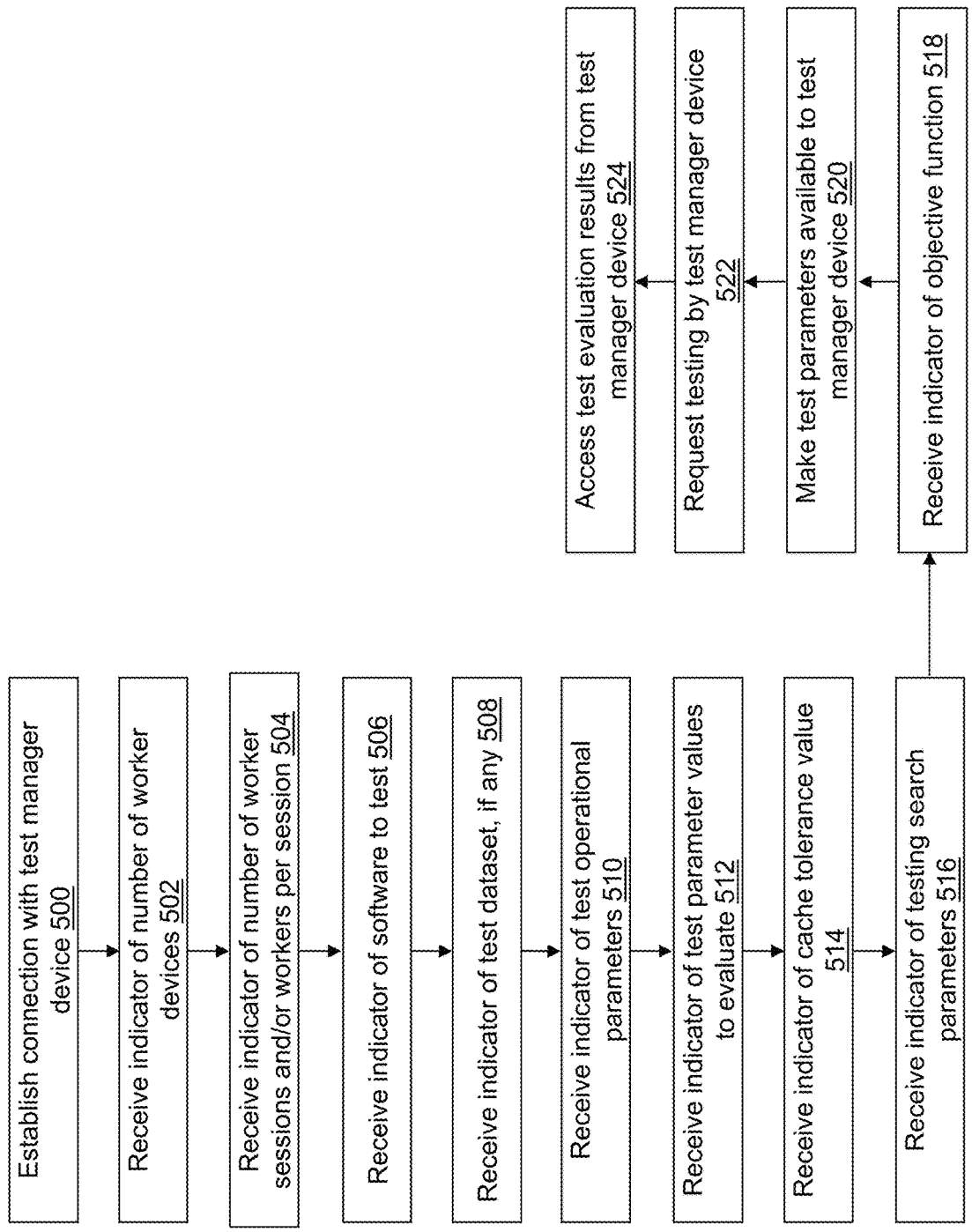
FIG. 5 depicts a flow diagram illustrating examples of operations performed by the user device of FIG. 2 in accordance with an illustrative embodiment.

Referring to FIG. 5, example operations associated with model test execution application 222 are described. Additional, fewer, or different operations may be performed depending on the embodiment. The order of presentation of the operations of FIG. 5 is not intended to be limiting. A user can interact with one or more user interface windows presented to the user in a display under control of model test execution application 222 independently or through a browser application in an order selectable by the user. Although some of the operational flows are presented in sequence, the various operations may be performed in various repetitions, concurrently, and/or in other orders than those that are illustrated. For example, a user may execute model test execution application 222, which causes presentation of a first user interface window, which may include a plurality of menus and selectors such as drop-down menus, buttons, text boxes, hyperlinks, etc. associated with model test execution application 222 as understood by a person of skill in the art. As further understood by a person of skill in the art, various operations may be performed in parallel, for example, using a plurality of threads or a plurality of computing devices such as a grid or a cloud of computing devices.

In an operation 500, a connection is established with test manager device 104. User device 200 accepts instructions from a user and relays the instructions to test manager device 104.

In an operation 502, a first indicator may be received that indicates a value of W the number of computing devices or nodes of worker system 106 that may include test manager device 104 (for example, the same or another indicator may indicate whether or not to include test manager device 104 as a worker device or it may or may not be included by default). The first indicator may further indicate whether test manager device 104 is configured in a single-machine mode or a distributed mode. In an alternative embodiment, the first indicator may not be received. For example, a default value may be stored, for example, in computer-readable medium 208 and used automatically. In another alternative embodiment, W may not be selectable. Instead, a fixed, predefined value may be used. The value further may be automatically determined based on a number of computing devices connected to test manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on test manager device 104. More simply, single-machine mode means multithreading on test manager device 104. Single-machine mode uses the number of CPUs (cores) on test manager device 104 to determine the number of concurrent threads. For example, one thread per core may be used though a number of threads on any computing device may be changed under control of the user. A grid host may be specified for a distributed mode and identify a domain name system or IP address of test manager device 104, when test manager device 104 is a separate device from user device 200.

In an operation 502, a second indicator may be received that indicates the value of N, the number of the one or more sessions, and/or the value of P, the number of computing devices included in each session. Within each session, when a test process is executed, each computing device of that session may use multiple threads. In an alternative embodiment, the second indicator may not be received. For example, default values may be stored, for example, in computer-readable medium 208 and used automatically. In another alternative embodiment, P or N may not be selectable. Instead, a fixed, predefined value may be used. The value(s) further may be automatically determined based on W and other criteria such that the user does not specify either or one of N and P included in each session. W, P, and N may all be equal to one.

In an operation 506, a third indicator may be received that indicates the software to test. For example, the third indicator indicates a location and a name of software to test 314 that may include code used to load a test dataset before executing software to test 314. As an example, the third indicator may be received by model test execution application 222 after selection from a user interface window or after entry by a user into a user interface window. For illustration, software to test 314 may be software that is under test such as a trained machine learning model though other types of software, such as a simulation or other software tool, may be the software that is under test. For example, software to test 314 may be defined using the SAS ASTORE format developed and provided by SAS Institute Inc. of Cary, North Carolina, USA for faster in-memory scoring.

In an operation 508, a fourth indicator may be received that indicates the test dataset. For example, the fourth indicator indicates a location and a name of the test dataset. As an example, the fourth indicator may be received by model test execution application 222 after selection from a user interface window or after entry by a user into a user interface window. In an alternative embodiment, the fourth indicator may not be received. For example, the software to test may not employ test data. In another alternative embodiment, the fourth indicator may include a plurality of test datasets, such as a list of test datasets that are each processed in succession.

In an operation 510, a fifth indicator may be received that provides test operational parameters. For example, the fifth indicator may include a first random seed value, a number of initial test configurations, a maximum overall execution time, a maximum test execution time, a maximum number of iterations, a maximum number of test configurations evaluated, etc. In an alternative embodiment, the fifth indicator may not be received. For example, a default value may be stored, for example, in computer-readable medium 208 and used automatically for one or more of the test operational parameters. In another alternative embodiment, a fixed, predefined value may be used for one or more of the test operational parameters. In an alternative embodiment, the first random seed value may be replaced with a plurality of random seed values, where the first random seed value is selected from the plurality of random seed values for an initial set of test configuration executions, a second random seed value is selected from the plurality of random seed values for a second initial set of test configuration executions after a restart determination, a third random seed value is selected from the plurality of random seed values for a third initial set of test configuration executions after a second restart determination, etc. In another alternative embodiment, the plurality of random seed values is determined from the first random seed value. For example, an offset value defined using the fifth indicator is added to a current random seed value, such as the first random seed value for the second random seed value, and the new value is saved as the next random seed value, and so on for a number of random seed values defined using the fifth indicator.

In an operation 512, a sixth indicator may be received that provides test parameter values to evaluate. For example, the sixth indicator may include a plurality of test parameters. For each test parameter of the plurality of test parameters, a parameter name, a parameter type, a parameter value range, a parameter flag to indicate whether the parameter is required or optional, etc. may be defined using the sixth indicator. Each test parameter is an input to software to test 314.

A test configuration includes a parameter value for each test parameter of the plurality of test parameters that is input to software to test 314 when software to test 314 is executed. The parameter type may indicate a type of variable such as integer, character, binary, numeric, nominal, continuous, etc. The parameter value range includes a minimum value and a maximum value to evaluate for the respective test parameter as part of the test process.

In an operation 514, a seventh indicator may be received that defines a cache tolerance value. The cache tolerance value is used to determine when a subsequent test configuration is "close enough" to a previously executed test configuration to not repeat execution with the subsequent test configuration. In an alternative embodiment, the seventh indicator may not be received. For example, a default value may be stored, for example, in computer-readable medium 208 and used automatically. An illustrative default value for the cache tolerance value is 1e-9. In another alternative embodiment, the cache tolerance value may not be selectable. Instead, a fixed, predefined value may be used.

In an operation 516, an eighth indicator may be received that defines values for one or more search parameters associated with a testing search method. The testing search method may be "LHS+GA/GSS" in which the LHS search method is used to generate a first set of test configurations that are each executed to generate an objective function value for each selected objective function. The objective function values and the test configuration associated with each are used to initialize a genetic search method (GA). Each population of the GA search method may be enhanced with a "growth step" in which a generating set search (GSS) search method is used to locally improve a promising member of the GA population.

For illustration, the LHS search method generates random test parameter values across the range of each test parameter and randomly combines them across test parameters. If the test parameter is continuous or discrete with more levels than a requested sample size, a random set of samples is taken across the test parameter range including a lower bound and an upper bound. If the test parameter is discrete with fewer levels than the requested sample size, each level is repeated an equal number of times across the set of test configurations determined by the LHS search method. If a last set of test configurations is less than the number of levels, the last set of values for the test parameter is randomly sampled across the set of levels given the remaining set size. The samples for each test parameter are randomly shuffled so that the combination of test parameters is random—the first values for each test parameter are combined, followed by all the second values, etc. The LHS search method ensures that the lower and upper bounds of the test parameter tuning range are included, and for discrete test parameters with a number of levels less than the requested sample size, the levels are sampled randomly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS method is designed for problems that have continuous variables and have the advantage that, in practice, they often require significantly fewer evaluations to converge than does a GA search method. Furthermore, a GSS method can provide a measure of local optimality that is very useful in performing multimodal optimization. The GSS method may add additional "growth steps" to the GA search method whenever the test parameter is a continuous variable. For example, a local search selection may include a small subset of test parameter values selected based on their fitness score and distance to other test parameter values and on pre-existing locally optimal test parameter values. A local search optimization may be applied such that the lower and upper bounds of the test parameter are modified to temporarily fix integer variables to their current setting. These additional growth steps may be performed each iteration to permit selected test configurations of the population (based on diversity and fitness) to benefit from local optimization over the continuous variables.

For example, the eighth indicator may include values for a maximum number of local evaluations $n_l$, a population size $n_p$, a number of centers $n_c$, an initial step size value $\Delta$, a decrease criterion value $\alpha \in (0,1)$, a restart threshold value $T_r$, etc. Table 1 below summarizes illustrative default and allowed values for one or more search parameters associated with the testing search method "LHS+GA/GSS":

TABLE 1

| Option | Default Value | Allowed Values |
|---|---|---|
| $n_l$ | 50 | [3-∞] |
| $n_p$ | 10 | [2-∞] |
| $n_c$ | 2 * $N_v$ | 0 or 2 * $N_v$ |
| $\Delta$ | 1 | 1 |
| $\alpha$ | 0.5 | 0.5 |
| $T_r$ | 0.75 | [0-1] |

Other testing search methods may be used as described in U.S. Pat. No. 10,360,517 titled Distributed Test Parameter Tuning System for Machine Learning and assigned to the assignee of the present application.

In an operation 518, a ninth indicator of an objective function may be received. For example, the ninth indicator indicates one or more names of objective functions. The objective function(s) specify a measure of model error or model accuracy to be used to identify a worst configuration of the test parameters among those evaluated to identify regions where software to test 314 fails or provides degraded performance. Unlike training a model to minimize error and/or maximize model accuracy, the objective function(s) may maximize the error and/or minimize the accuracy achieved using software to test 314. The objective function(s) may further specify a model execution characteristic such as whether the test execution failed and an error code when generated, an execution time, a memory used during the test execution, etc. The ninth indicator may be received by model test execution application 222 after selection from a user interface window or after entry by a user into a user interface window. A default value for the objective function may further be stored, for example, in computer-readable medium 208. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", "Pass/Fail", "Execution Time", "Memory", etc.

ASE uses an average squared error as the objective function; AUC uses an area under a curve as the objective function (nominal type only); F05 uses a F0.5 coefficient as the objective function (nominal type only); F1 uses an F1 coefficient as the objective function (nominal type only); GAMMA uses a gamma coefficient as the objective function (nominal type only); GINI uses a Gini coefficient as the objective function (nominal type only); KS uses a Kolmogorov-Smirnov coefficient as the objective function (nominal type only); MAE uses a mean absolute error as the objective function (interval type only); MCE uses a misclassification rate as the objective function (nominal type only); MCLL uses a multiclass log loss as the objective function (nominal type only); MISC uses a misclassification error percentage as the objective function (nominal type only); MSE uses a mean squared error as the objective function (interval type only); MSLE uses a mean squared logarithmic error as the objective function (interval type only); RASE uses a root average squared error as the objective function; RMAE uses a root mean absolute error as the objective function (interval type only); RMSLE uses a root mean squared logarithmic error as the objective function (interval type only); and TAU uses a tau coefficient as the objective function (nominal type only). Pass/Fail uses a failure flag as the objective function, Execution Time uses a test execution time as the objective function, and Memory uses a memory usage as the objective function.

Multiple target variables may be indicated. For example, for performance testing, the objective may be to identify test configurations that consume a lot of memory or result in a large execution time. To achieve this test purpose, the memory usage and test execution time may both be indicated as target variables.

In an operation 520, the test parameters that may include the parameters indicated in operations 502 to 518 are made available to test manager device 104. For example, the values of any of the parameters that are not default values may be sent to test manager device 104. As another option, a location of the values of any of the parameters that are not default values may be sent to test manager device 104.

In an operation 522, a test of software to test 314 is requested of test manager device 104 using the provided test parameters.

In an operation 524, test evaluation results are accessed. For example, an indicator may be received that indicates that the testing process is complete. For example, one or more output tables may be presented on display 216 when the testing process is complete. As another option, display 216 may present a statement indicating that the testing process is complete. The user can then access the output tables in the specified location. The output tables may summarize the testing results that may include the results stored in test history data 318.

Test evaluation results further may be accessed as the testing is being performed by test manager device 104. For example, a table with evaluation results may be updated each iteration. As another example, graphical results may be presented and updated on display 216 as they are received from test manager device 104 instead of waiting until the testing is complete.

Illustrative graphical results that may be presented during or after completion of the testing are described in U.S. Pat. No. 11,151,480, titled Hyperparameter Tuning System Results Viewer and assigned to the assignee of the present application. The hyperparameters are replaced with the test parameters to present similar graphical results though the test parameters relate to software to test 314 and may be used to identify test parameters associated with software errors or having values that result in degraded performance of software to test 314. For example, the degraded performance may be indicated by less accuracy, more error, or increased execution time and/or computer memory usage relative to other values.

Referring to FIGS. 6A through 6D, example operations associated with test execution manager application 312 are described. Additional, fewer, or different operations may be performed depending on the embodiment. The order of presentation of the operations of FIGS. 6A through 6D is not intended to be limiting. Test manager device 104 establishes communication with the computing devices of worker system 106, sends instructions to each session manager device 400 associated with each session established by test manager device 104, collects and aggregates the results of computations from each session, and communicates final results to user device 200. Test manager device 104 may utilize itself as a worker computing device of worker system 106. The computing devices of worker system 106 receive instructions from test manager device 104, store and process data, and send the results of computations back to test manager device 104 under control of each session manager device 400 of each session. Worker computing devices of each session may also communicate to each other directly to complete tasks.

In an operation 600, test parameters obtained by model test execution application 222 are accessed. For example, values for parameters indicated in operations 502 to 518 and made available to test manager device 104 in operation 520 are accessed.

In an operation 601, the number of workers per session P and the number of sessions N are determined. For example, when the first indicator specifies N, that value is used for the number of sessions, or when the first indicator specifies P, that value is used for the number of workers per session. If W is equal to all of the workers that are connected to test manager device 104 and there are at least 16 worker computing devices included in worker system 106, N may be limited to eight so that the number of workers per session P is at least two. Optionally, the second indicator may indicate that P is set based on a size of the test dataset.

When N is greater than one and P is equal to one, test execution manager application 312 is executed in a model parallel mode; when P is greater than one and N is equal to one, test execution manager application 312 is executed in a data parallel mode; and when both P and N are greater than one, test execution manager application 312 is executed in a data and model parallel mode. In an automatic mode, N may be selected to be as large as possible with P as small as possible subject to the size of the test dataset because model parallel is more efficient than data parallel.

In an operation 602, the number of sessions N are created to include the number of workers per session P with session manager device 400 selected for each created session.

In an operation 603, a thread is allocated from an available thread pool to each created session. The allocated threads each manage the communications between test manager device 104 and each session manager device 400. Additionally, an iteration counter may be initialized, for example, using $N_i=1$, where $N_i$ is the iteration counter.

In an operation 604, a data structure may be created for each session through which each session is notified of the test dataset, of the test parameter values for the assigned test configuration, of software to test 314, etc. An illustrative data structure includes a thread identifier that links the data structure to each thread, a session handle for the thread, a parameter list for testing software to test 314, a data filter for the test dataset, a test time, a completion indicator, etc. Other methods for communicating with the computing devices of worker system 106 may be used in alternative embodiments.

In an operation 605, a request is sent to each session manager device 400 to distribute the test dataset across each session worker device 420 when P>1 or to load the test dataset when P=1.

In an operation 606, a current test configuration list is generated based on the test parameter values to evaluate indicated in operation 512 and the testing search method indicated in operation 516 using a next random seed value. For a first iteration of operation 606, a first random seed value is used as the next random seed value; for a second iteration of operation 606, a second random seed value is used as the next random seed value. For example, when LHS is used to generate an initial set of test configurations for the testing search method, the current test configuration list is selected using LHS with the first random seed value indicated in operation 510. Each test configuration of the current test configuration list includes a value selected for each test parameter value to evaluate indicated in operation 512 based on the parameter value range. The current test configuration list may be stored in test configuration data 316. Though the term "list" is used, it should be understood that the set of test configurations can be stored in other types of data structures.

In an operation 607, each test configuration is selected from the current test configuration list and assigned to a session. Depending on the number of sessions N and a number of test configurations T included in the current test configuration list, all or less than all of the sessions may be assigned a test configuration when T≤N. When T>N, one or more test configurations may be assigned after an assigned test configuration completes execution.

In an operation 608, the data structure associated with each session is updated with the assigned test configuration.

In an operation 609, a request is sent to each session manager device 400 to execute software to test 314 with the assigned test configuration based on the test parameter values stored in the data structure.

In an operation 610, a determination is made concerning whether or not any execution is done. For example, session manager device 400 may set the completion indicator to indicate done in the data structure associated with it. If no execution is done, processing continues in operation 610 until indication that a session is done is received. If any execution is done, processing continues in an operation 611. For illustration, test manager device 104 loops through each of its thread handles, checking to see if that particular thread is busy or free. When a session finishes executing its assigned test configuration, session manager device 400 returns the computed values back to test manager device 104 and sets its completion indicator indicating that it is available to receive a new test configuration for execution.

In operation 611, results generated by the now available session are accessed.

In an operation 612, the test configuration and the configuration results are stored in test history data 318. For illustration, Table 2 below provides a list of parameters that may be stored in test history data 318.

TABLE 2

| Parameter Name | Parameter Description |
| --- | --- |
| testID | ID of test configuration |
| testOpts | Option combinations of test that is a string created from the selected test parameter values to evaluate |
| severity | A severity code that indicates whether the software execution succeeded or failed.<br>0-Indicates that the software execution completed successfully.<br>1-Indicates a minor issue that did not prevent the software execution from completing successfully.<br>2-Indicates an error that prevented the software execution from completing successfully.<br>The reason code may provide additional information. |
| reason | A reason code provides general information about the status code. Illustrative code values include:<br>0-Indicates that the software execution completed successfully.<br>1-Indicates a permission problem.<br>2-Indicates a network problem during connection or a network connection failure.<br>3-Indicates an insufficient memory condition.<br>4-Indicates an authentication error.<br>5-Indicates an unexpected error condition that prevented the software execution from completing successfully.<br>6-Indicates a severe error condition that cause the software execution to terminate. |
| status | The action status code returned by software to test 314. |
| duration | Execution time required for test execution. |
| memory | Memory consumed by the test execution. |
| cancelled | Indicates whether the test was cancelled or not. |
| testParameters | List of each test parameter and its associated value defined for the test configuration executed. |

The test configuration and the configuration results further may be stored in an evaluation cache. The configuration results include the objective function value that resulted from execution of software to test 314 using each respective test configuration.

In an operation 613, a determination is made concerning whether or not the current test configuration list includes another test configuration to evaluate that has not been assigned to a session. If the current test configuration list includes another test configuration to evaluate, processing continues in an operation 614. If the current test configuration list does not include another test configuration to evaluate, processing continues in an operation 617.

In operation 614, a next test configuration is selected from the current test configuration list and assigned to the now available session.

In an operation 615, the data structure associated with the now available session is updated with the next assigned test configuration.

In an operation 616, a request is sent to session manager device 400 associated with the now available session to execute software to test 314 with the test configuration included in the data structure, and processing continues in operation 610 to continue to monitor for sessions that have completed their assigned test configuration execution.

In operation 617, a determination is made concerning whether or not the iteration is done such that execution of each test configuration in the current test configuration list has completed. If the iteration is done, processing continues in an operation 620 shown referring to FIG. 6B. If the iteration is not done, processing continues in operation 610 to continue to wait for sessions to complete execution with their assigned test configuration.

Figure 6B:
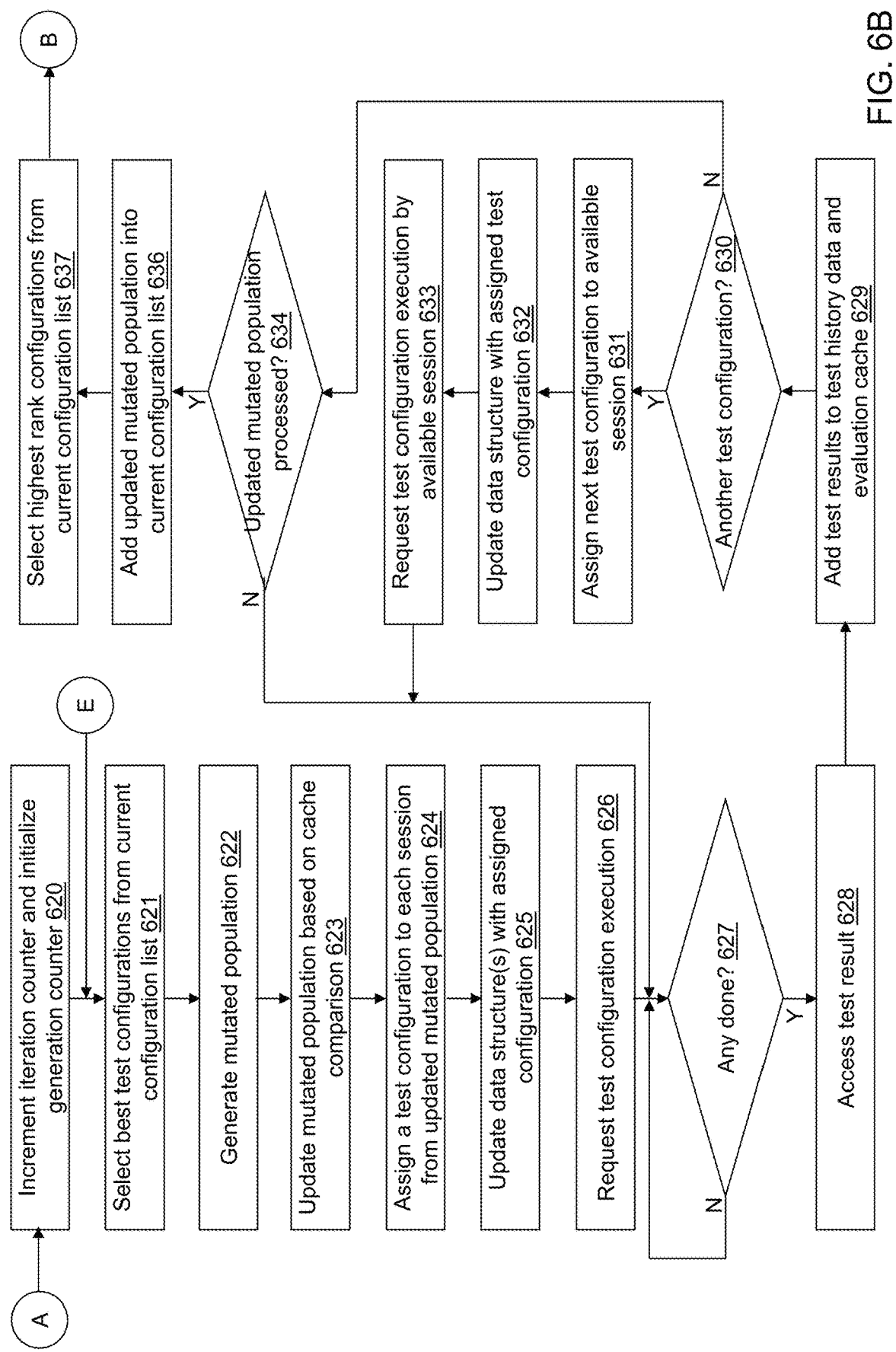

Referring to FIG. 6B, in operation 620, the iteration counter $N_i$ may be incremented, and the generation counter $N_g$ may be initialized, for example, using $N_i=N_i+1$ and $N_g=1$, where $N_g$ is the generation counter.

In an operation 621, a predefined number of best test configurations are selected from the current test configuration list using the objective function value computed for each test configuration. For example, the predefined number may be the population size $n_p$ indicated in operation 516. The best test configurations may be selected based on extrema values that may be maximum values or minimum values depending on the objective function.

In an operation 622 a mutated population of test configurations is generated for each of the selected best test configurations, for example, using a GA. In the normal execution of the GA, two promising candidate test configurations are crossed-over to create a new child candidate with properties inherited from the parents based on a pre-defined mutation probability. As this crossover operation occurs over a few iterations, the population of test configurations naturally collapses around a promising region of the test parameter search space. Unfortunately, for nominal variables, this isn't necessarily a good strategy.

In previous methods, a nominal variable value was mapped to an integer value. For example, for a nominal variable that defines a hair color, the value could be mapped as 0=blonde, 1=brown, 2=black, 3=red, 4=other. As previous testing search methods explored the search space recommending new values of the variable to evaluate, there was an implicit understanding that values in a neighborhood together have a similar effect on an evaluation result. However, if a nominal variable has been encoded as an 'integer' type, this closeness assumption may not be correct. A value of 3 has no closeness relationship relative to a value of 2 based on the associated meaning. For example, if a hair color of blonde is evaluated to be a promising value, there is no reason to assume that a color of brown will yield similar results, even though in the integer encoding their numeric values are neighbors.

As a result, nominal variable values are not mutated in the manner that other variables such as integer or continuous variables are mutated to determine a new child test configuration. When generating a value for any nominal variable in a new child test configuration, a new nominal value is chosen randomly. A weighting scheme may be employed for the random selection of values based on how often each nominal value has been chosen in the previous GA populations. For example, an array may be maintained that counts a number of times that each value is selected for each nominal variable. A weight value may be computed for each nominal variable value for a respective nominal variable from the counts relative to the total number of counts for the respective nominal variable. The weight value may used as a divisor to increase a likelihood that less used values are selected over time to maintain an approximately equal selection probability for each value of each nominal variable.

Figure 9A:
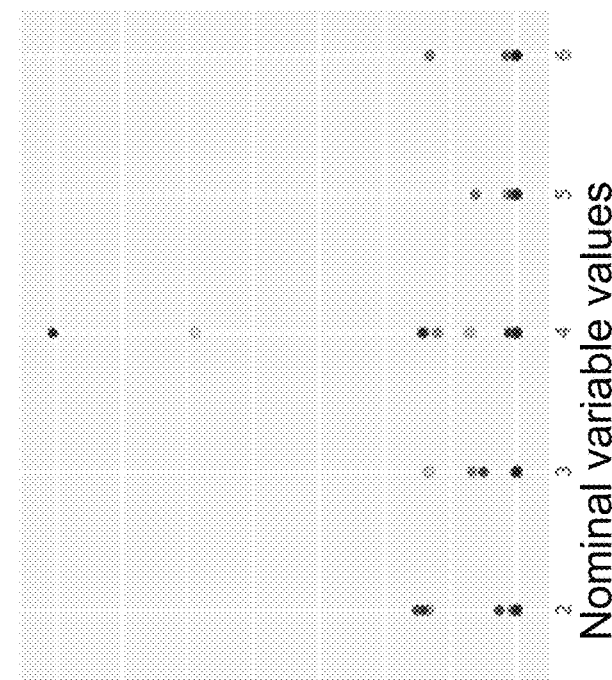
FIG. 9A shows an objective function value computed for different values of a nominal variable using an existing method for selecting the nominal variable value in accordance with an illustrative embodiment.
Figure 9B:
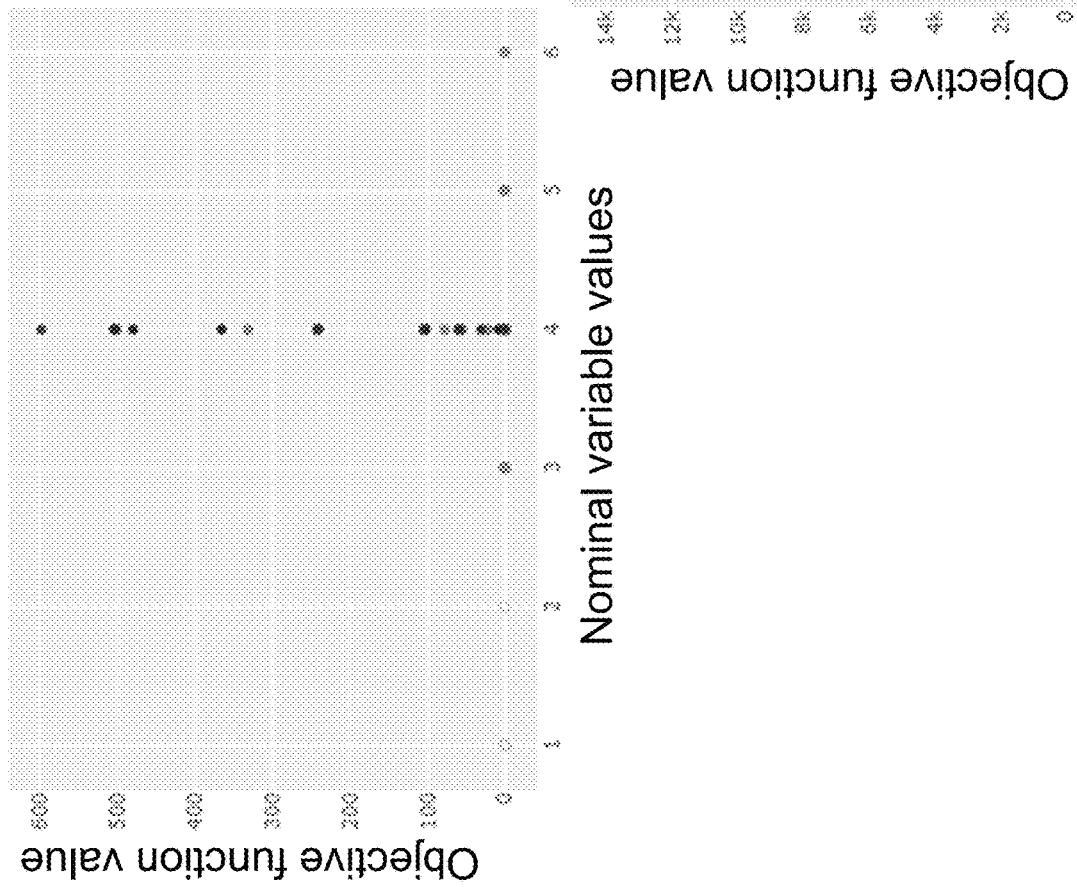
FIG. 9B shows an objective function value computed for different values of the nominal variable using the test system of FIG. 1 to select the nominal variable value in accordance with an illustrative embodiment.

For illustration, referring to FIG. 9A, an objective function value computed for different values of a nominal variable mapped to integer values that are mutated is shown in accordance with an illustrative embodiment. As expected, the values collapse to an integer value of four indicating that the value space may be inadequately searched. Referring to FIG. 9B, an objective function value computed for different values of the nominal variable is shown using randomly selected values instead of mutated value in accordance with an illustrative embodiment. The values selected are much more evenly distributed indicating a better evaluation of the search space for the nominal variable.

Referring again to FIG. 6B, in an operation 623, the mutated population of test configurations is updated based on a comparison between each test configuration included in the mutated population of test configurations and each test configuration included in the evaluation cache. For example, each test configuration is compared to previously evaluated test configurations to determine if they are "close enough" based on the cache tolerance value indicated in operation 514. If so, the test configuration is removed from the mutated population of test configurations to avoid expending computing resources reevaluating a "too similar" test configuration.

For illustration, a Euclidean distance value may be computed between each test configuration included in the mutated population of test configurations and each test configuration included in the evaluation cache. The test parameter values of each test configuration may be normalized or scaled before the distance value is computed. When the distance value computed between a respective test configuration included in the mutated population of test configurations and any test configuration included in the evaluation cache is less than or equal to the cache tolerance value, the respective test configuration is removed from the mutated population of test configurations.

Similar to operation 607, in an operation 624, each test configuration is selected from the updated mutated population of test configurations and assigned to a session.

Similar to operation 608, in an operation 625, the data structure associated with each session is updated with the assigned test configuration.

Similar to operation 609, in an operation 626, a request is sent to each session manager device 400 to execute software to test 314 with the assigned test configuration based on the test parameter values stored in the data structure.

Similar to operation 610, in an operation 627, a determination is made concerning whether or not any execution is done. If no execution is done, processing continues in operation 627 until indication that a session is done is received. If any execution is done, processing continues in an operation 628.

Similar to operation 611, in an operation 628, results generated by the now available session are accessed.

Similar to operation 612, in an operation 629, the test configuration and the configuration results are stored in test history data 318 and in the evaluation cache.

Similar to operation 613, in an operation 630, a determination is made concerning whether the updated mutated population of test configurations includes another test configuration to evaluate that has not been assigned to a session. If the updated mutated population of test configurations includes another test configuration to evaluate, processing continues in an operation 631. If the updated mutated population of test configurations does not include another test configuration to evaluate, processing continues in an operation 634.

Similar to operation 614, in operation 631, a next test configuration is selected from the updated mutated population of test configurations and assigned to the now available session.

Similar to operation 615, in an operation 632, the data structure associated with the now available session is updated with the next assigned test configuration.

Similar to operation 616, in an operation 633, a request is sent to session manager device 400 associated with the now available session to execute software to test 314 with the test configuration included in the data structure, and processing continues in operation 627 to continue to monitor for sessions that have completed their assigned test configuration execution.

Similar to operation 617, in operation 634, a determination is made concerning whether or not the iteration is done such that execution of each test configuration in the updated mutated population of test configurations has completed. If the iteration is done, processing continues in an operation 636. If the iteration is not done, processing continues in operation 627 to continue to wait for sessions to complete execution with their assigned test configuration.

In operation 636, the updated mutated population of test configurations is added to the current test configuration list.

Figure 6C:
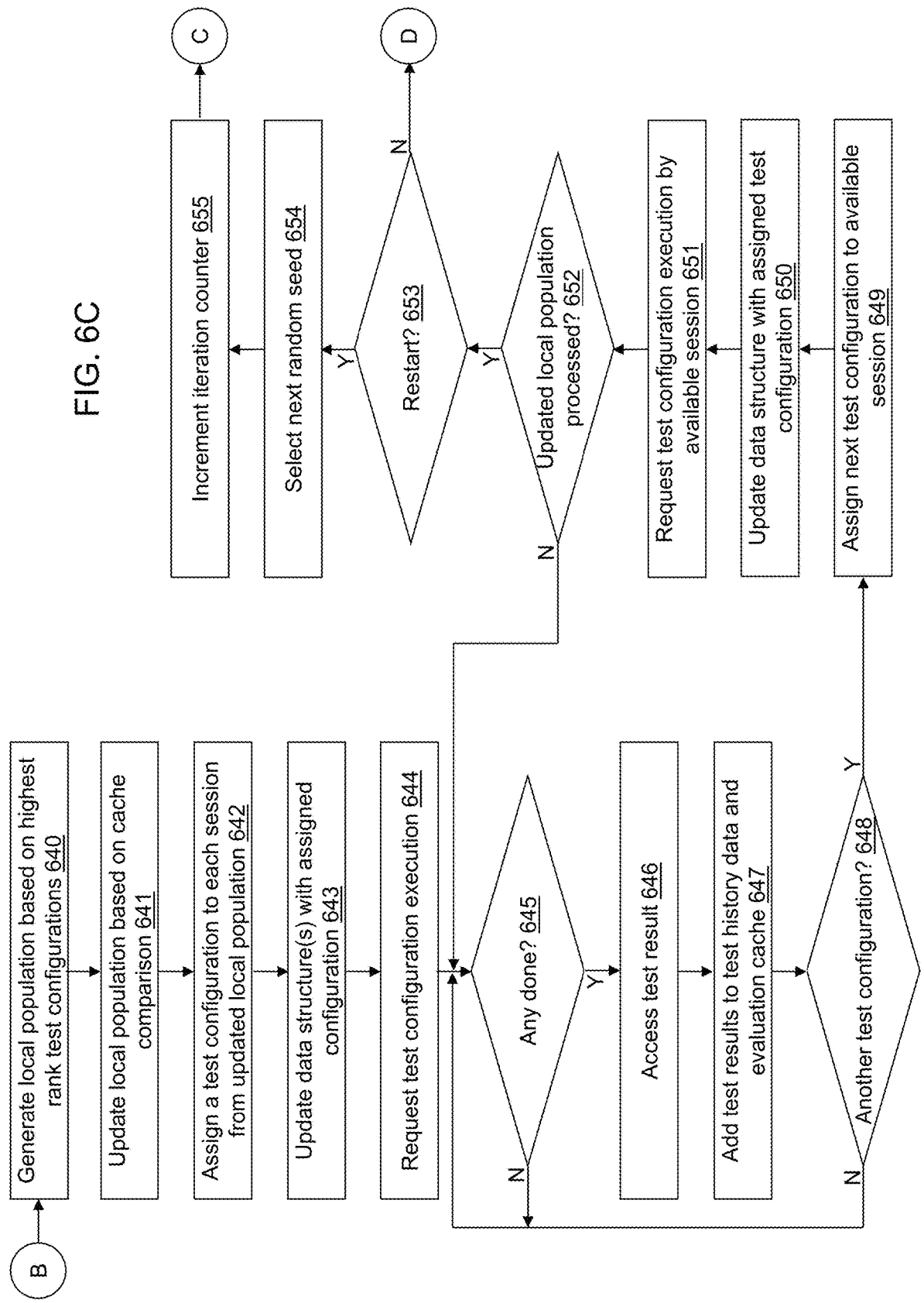

In an operation 637, a predefined number of highest rank test configurations are selected from the current test configuration list, and processing continues in an operation 640 shown referring to FIG. 6C. A rank of a matrix that includes each test configuration included in the current test configuration list is computed and the test configurations having the highest rank are selected. For example, the predefined number may be the number of local evaluations $n_1$ indicated in operation 516.

Referring to FIG. 6C, in operation 640, a local population of test configurations is generated based on the selected highest rank test configurations, for example, using a GSS. For example, the local population of test configurations is selected based on $$\min_{t \in \mathbb{R}} f(t, \text{int}(t_{b,i})), i = 1, \ldots, n_l$$

subject to $t_l \le t \le t_u$ where t indicates a local test configuration, $\mathbb{R}^{n_a}$ indicates the selected highest rank test configurations, $t_b$ indicates a test configuration selected from the selected highest rank test configurations, $t_l$ indicates a test configuration having a lower bound value for each test parameter, and $t_u$ indicates a test configuration having an upper bound value for each test parameter. A local search optimization may be applied such that the lower and upper bounds of the test parameter are modified to temporarily fix integer variables to their current setting.

Similar to operation 623, in an operation 641, the local population of test configurations is updated based on a comparison between each test configuration included in the local population of test configurations and each test configuration included in the evaluation cache.

Similar to operation 607, in an operation 642, each test configuration is selected from the updated local population of test configurations and assigned to a session.

Similar to operation 608, in an operation 643, the data structure associated with each session is updated with the assigned test configuration.

Similar to operation 609, in an operation 644, a request is sent to each session manager device 400 to execute software to test 314 with the assigned test configuration based on the test parameter values stored in the data structure.

Similar to operation 610, in an operation 645, a determination is made concerning whether or not any execution is done. If no execution is done, processing continues in operation 645 until indication that a session is done is received. If any execution is done, processing continues in an operation 646.

Similar to operation 611, in an operation 646, results generated by the now available session are accessed.

Similar to operation 612, in an operation 647, the test configuration and the configuration results are stored in test history data 318 and in the evaluation cache.

Similar to operation 613, in an operation 648, a determination is made concerning whether the updated local population of test configurations includes another test configuration to evaluate that has not been assigned to a session. If the updated local population of test configurations includes another test configuration to evaluate, processing continues in an operation 649. If the updated local population of test configurations does not include another test configuration to evaluate, processing continues in operation 645.

Similar to operation 614, in operation 649, the next test configuration is selected from the updated local population of test configurations and assigned to the now available session.

Similar to operation 615, in an operation 650, the data structure associated with the now available session is updated with the next assigned test configuration.

Similar to operation 616, in an operation 651, a request is sent to session manager device 400 associated with the now available session to execute software to test 314 with the test configuration included in the data structure, and processing continues in operation 645 to continue to monitor for sessions that have completed their assigned test configuration execution.

Similar to operation 617, in operation 652, a determination is made concerning whether or not the iteration is done such that execution of each test configuration in the updated local population of test configurations has completed. If the iteration is done, processing continues in an operation 653. If the iteration is not done, processing continues in operation 645 to continue to wait for sessions to complete execution with their assigned test configuration.

Figure 8:
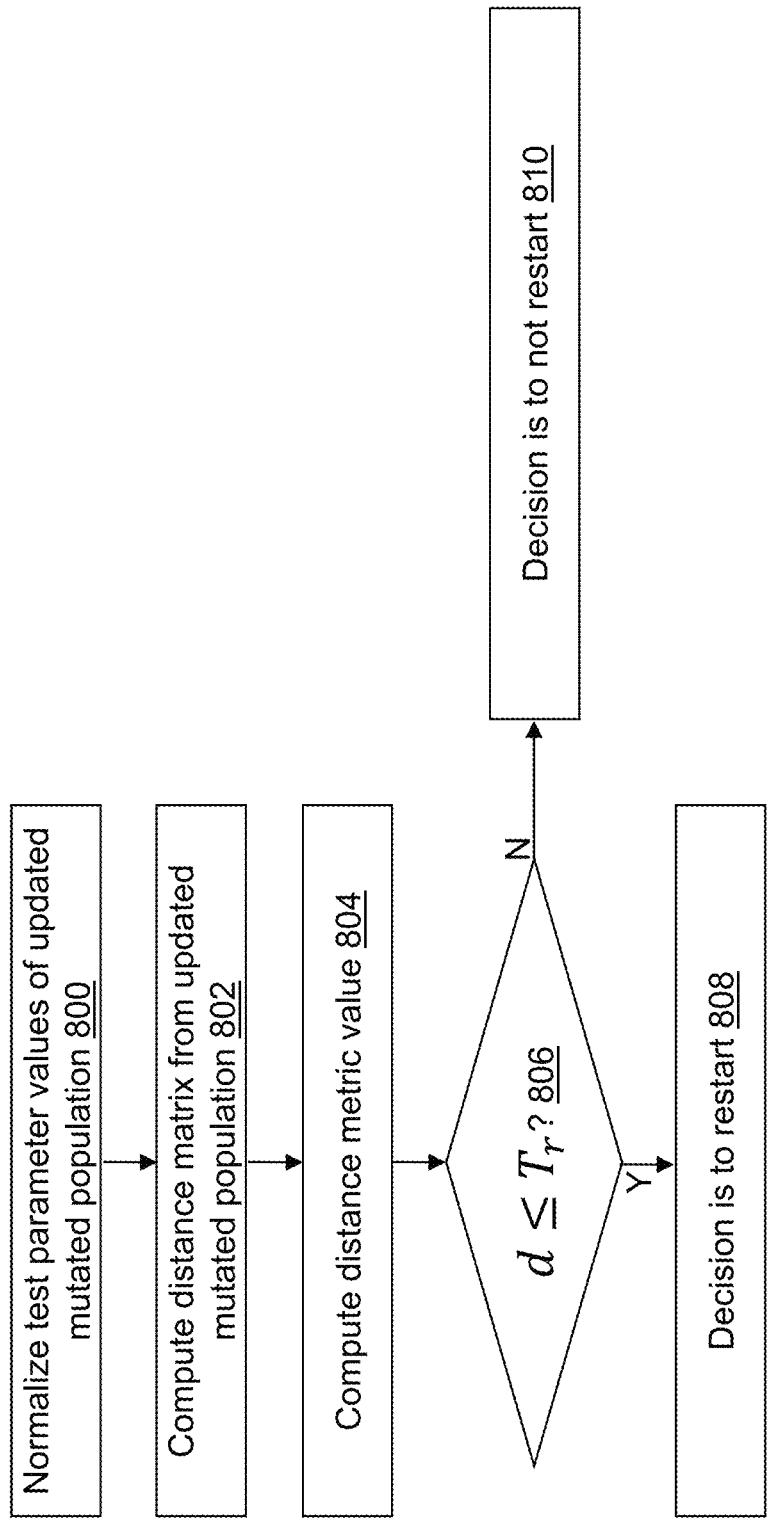
FIG. 8 depicts a flow diagram illustrating examples of operations performed by the test manager device of FIG. 3 to determine whether a restart is triggered in accordance with an illustrative embodiment.

In operation 653, a determination is made concerning whether the testing search method should be restarted. If the testing search method should be restarted, processing continues in an operation 654. If the testing search method should not be restarted, processing continues in an operation 660 shown referring to FIG. 6D. For example, referring to FIG. 8, example operations associated with model execution manager application 412 determining whether to restart the testing search method are described. The determination is based on the updated mutated population determined in operation 623 and on the updated local population determined in operation 641 labeled as the updated population for reference below. Additional, fewer, or different operations may be performed depending on the embodiment. The order of presentation of the operations of FIG. 8 is not intended to be limiting.

In an operation 800, values for each test parameter of the updated population are normalized so that all values are scaled between values of zero and one.

In an operation 802, a distance matrix D is computed for the test configurations included in the updated population using the normalized test parameter values. For example, a Euclidean distance may be computed between each pair of test configurations included in the updated population to define a matrix having $n_{up}*r_{up}$ elements, D[i]=1, . . . , $n_{up}*r_{up}$, where $r_{up}$ indicates a number of test configurations included in the updated population.

In an operation 804, a distance metric value d is computed from the distance matrix D. For example, the distance metric value d is computed using for ($i$=1; $i$<$n_{up}*n_{up}$; $i$++)

$d$+=$e^{(-D[i]/N_T)}$;

$d$=$d/(n_{up}*(n_{up}-1))$;

where $N_T$ indicates a number of test parameters included in each test configuration. The distance metric value d has a value between zero and one that can be used to determine how close the test configurations of the updated population are to each other. When the distance metric value d is close to one, the test configurations are sufficiently spread apart across the test parameter search space. When the distance metric value d is reduced towards zero, the test configurations are getting closer together and collapsing around a single best point.

In an operation 806, a determination is made concerning whether or not the distance metric value d is at or below the restart threshold value $T_r$ indicated in operation 516. If d≤$T_r$, processing continues in an operation 808. If d>$T_r$, processing continues in an operation 810.

In operation 808, the decision is to restart the testing search method.

In operation 810, the decision is to not restart the testing search method.

Referring again to FIG. 6C, in operation 654, a next random seed value is selected. For example, when the plurality of random seeds is indicated in operation 510, the next random seed value is selected from the plurality of random seeds.

In an operation 655, the iteration counter $N_i$ may be incremented, for example, using $N_i$=$N_i$+1, and processing continues in operation 606 shown referring to FIG. 6A to restart the testing search method.

Figure 6D:
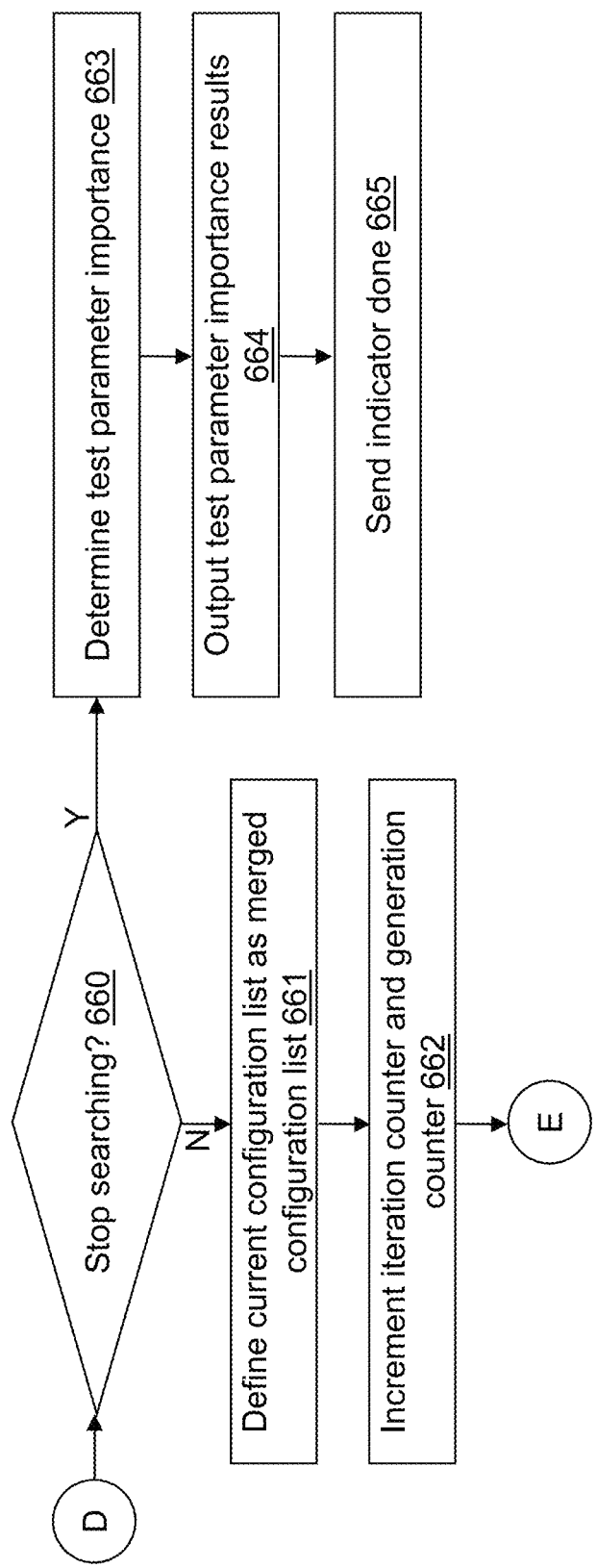

Referring to FIG. 6D, in operation 660, a determination is made concerning whether or not the testing search method should be stopped. If the testing search method should be stopped, processing continues in an operation 662. If the testing search method should not be stopped, processing continues in an operation 661. For example, the testing search method may be stopped when one or more of the criteria indicated in operation 510 is satisfied based on various counters and/or time measurements. For illustration, the testing search method may be stopped when the maximum number of iterations have been performed, when the maximum number of test configuration evaluations have been performed, when the maximum overall execution time and/or the maximum test execution time have been exceeded, etc.

In operation 661, the current test configuration list is defined as the merged configuration list created in operation 636.

In an operation 662, the iteration counter $N_i$ and the generation counter $N_g$ may be incremented, for example, using $N_i$=$N_i$+1 and $N_g$=$N_g$+1, and processing continues in operation 621 shown referring to FIG. 6B to generate a new mutated population.

In operation 663, an importance or significance of each test parameter is determined. The importance or significance is a measure of how much each test parameter contributes to the value of the objective function(s) that result from each test execution. For example, the test parameter importance determination may be performed using the methods described in U.S. Pat. No. 10,600,005 titled System for Automatic, Simultaneous Feature Selection and Hyperparameter Tuning for a Machine Learning Model and in U.S. Pat. No. 10,963,802 titled Distributed Decision Variable Tuning System for Machine Learning both of which are assigned to the assignee of the present application. For illustration, an autotuned random forest model may be trained to determine each test parameters importance and relative importance using test history data 318. By quantifying each test parameter's contribution unimportant variables can be filtered from new test configurations saving computing resources.

In an operation 664, the importance or significance of each test parameter may be output to parameter importance data 320.

In an operation 665, a done indicator is sent to user device 200.

Figure 7B:
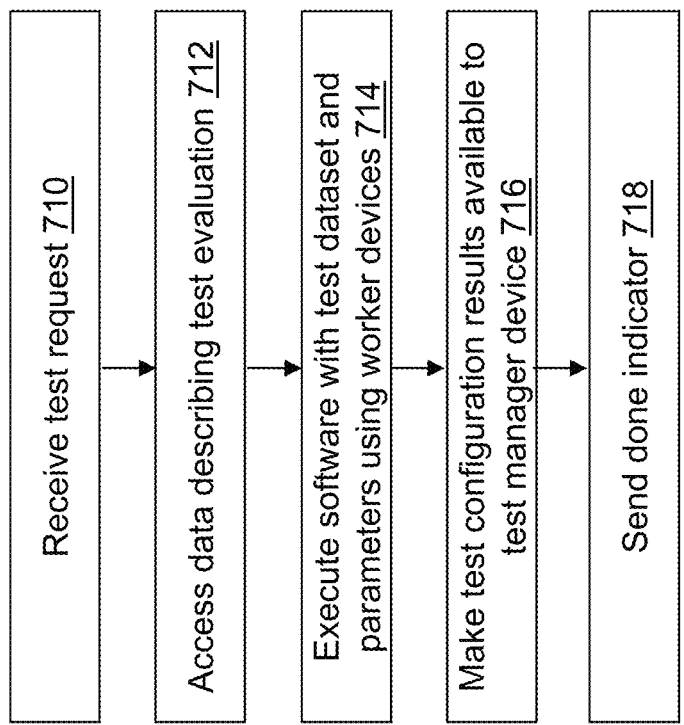
FIGS. 7A and 7B depict a flow diagram illustrating examples of operations performed by the session manager device of FIG. 4A in accordance with an illustrative embodiment.
Figure 7A:

Referring to FIGS. 7A and 7B, example operations associated with model execution manager application 412 are described. Additional, fewer, or different operations may be performed depending on the embodiment. The order of presentation of the operations of FIGS. 7A and 7B is not intended to be limiting. FIG. 7A shows operations in response to the request in operation 605 from test manager device 104; whereas, FIG. 7B shows operations in response to the requests in any of operations 609, 616, 626, 633, 644, and 651 from test manager device 104.

Referring to FIG. 7A, in an operation 700, an indicator of worker devices in the session to which session manager device 400 is assigned is received from test manager device 104 in the request initiated by operation 605.

In an operation 702, the test dataset is loaded and distributed across the computing devices of the session such that each computing device is loaded with a portion of the test dataset when P>1. When P=1, the test dataset may be loaded on session manager device 400 of each session.

Referring to FIG. 7B, in an operation 710, the test request sent by test manager device 104 in any of operations 609, 616, 626, 633, 644, and 651 is received by session manager device 400.

In an operation 712, the data describing the test configuration is accessed. For example, data in the data structure associated with the thread is accessed. Software to test 314 is further accessed either using the data structure or another mechanism.

In an operation 714, software to test 314 is executed using the test configuration accessed and test dataset subset 434 at each session worker device 420 and optionally test dataset subset 414 at session manager device 400 when session manager device 400 is also acting as a worker in a session or there is a single worker computing device in each session.

In an operation 716, the test configuration results are made available to test manager device 104, for example, by including them in the data structure, updating a globally accessible table, etc.

In an operation 718, the completion indicator of the data structure is set to notify test manager device 104 that processing of the test configuration is complete.

Model test execution application 222, test execution manager application 312, model execution manager application 412, and model execution worker application 432 automatically test software to test 314 generating new test configurations based on the testing search method indicated in operation 516 to define test configurations that identify model errors/failures and/or performance degradations more efficiently thereby requiring fewer computing resources and less user time. Test execution manager application 312 is an improvement over other methods because it determines when to restart the testing search method, handles values for test parameters that are nominal variables in a more realistic manner, and provides a more random initial set of test configurations using LHS.

Figure 10A:
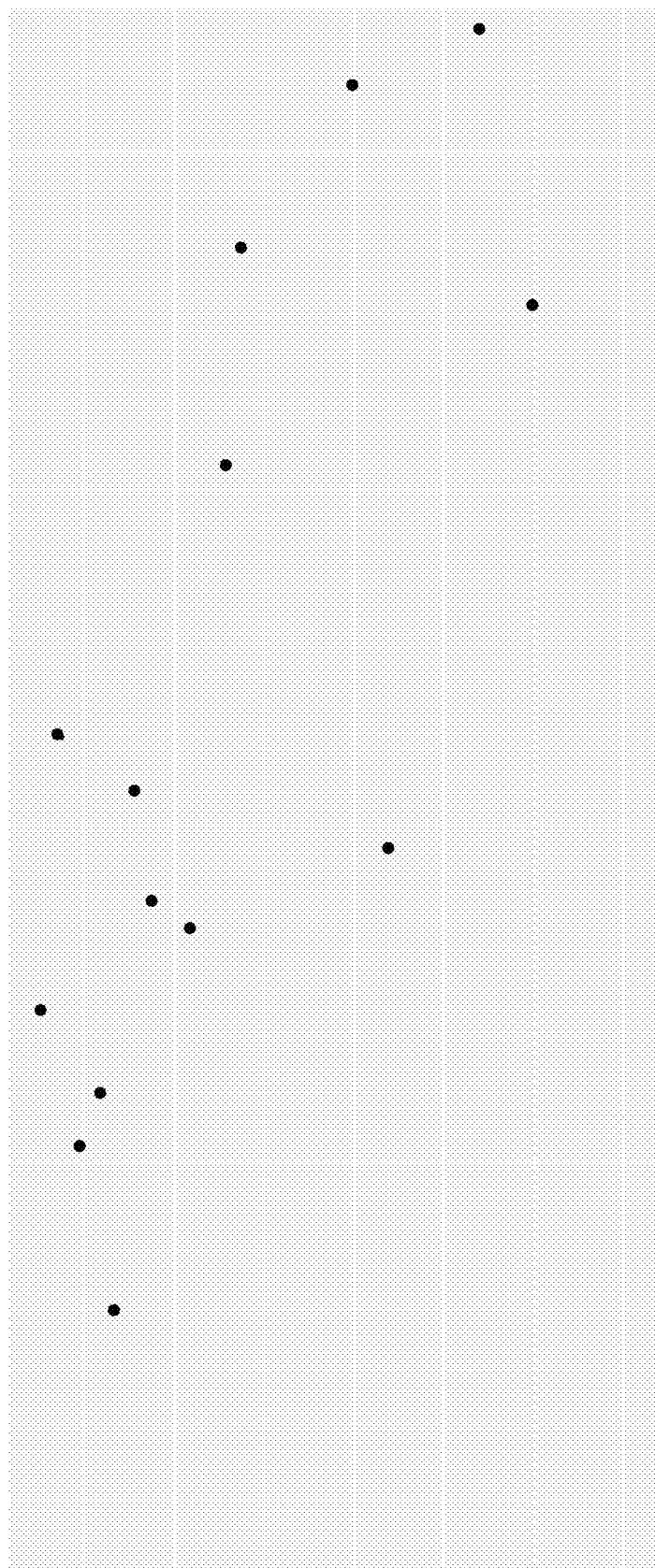
FIGS. 10A-10D show paired variable values for different iterations determined using the existing method in accordance with an illustrative embodiment.
Figure 10B:
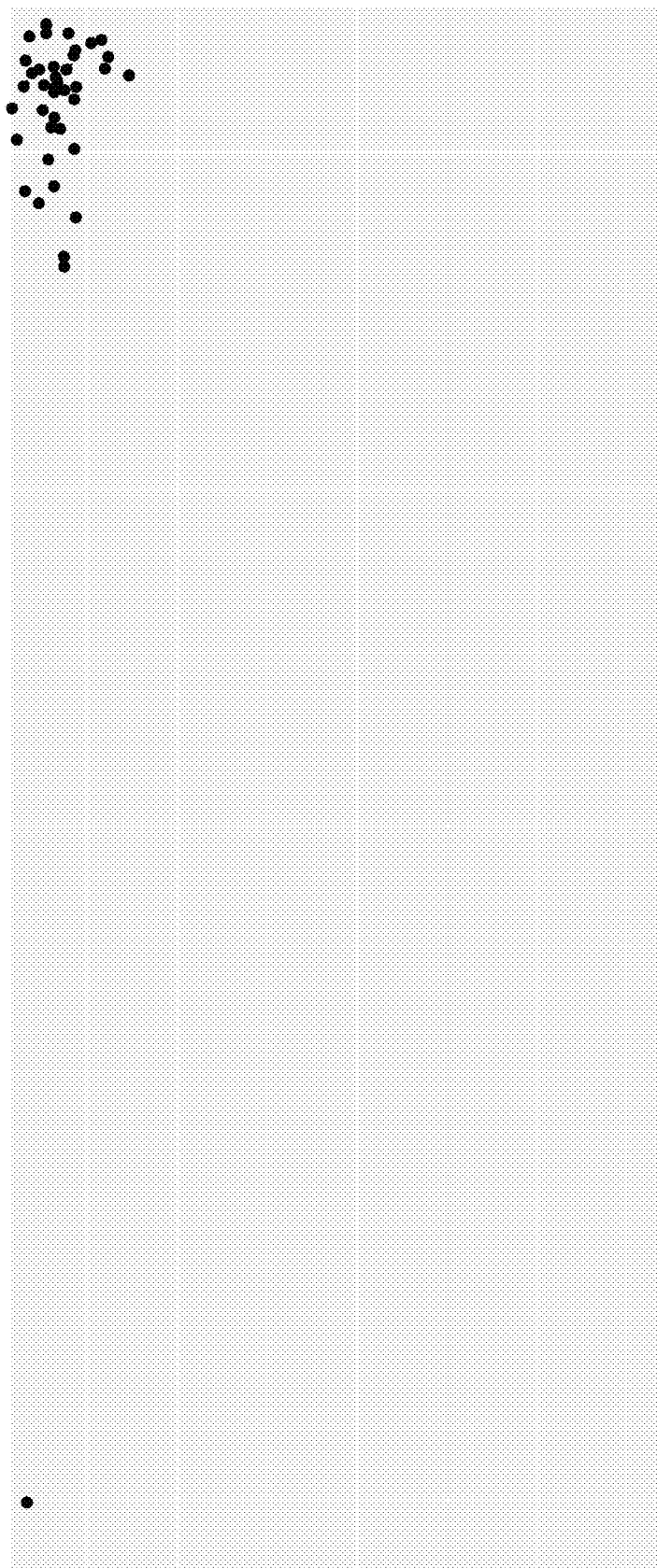
Figure 10C:
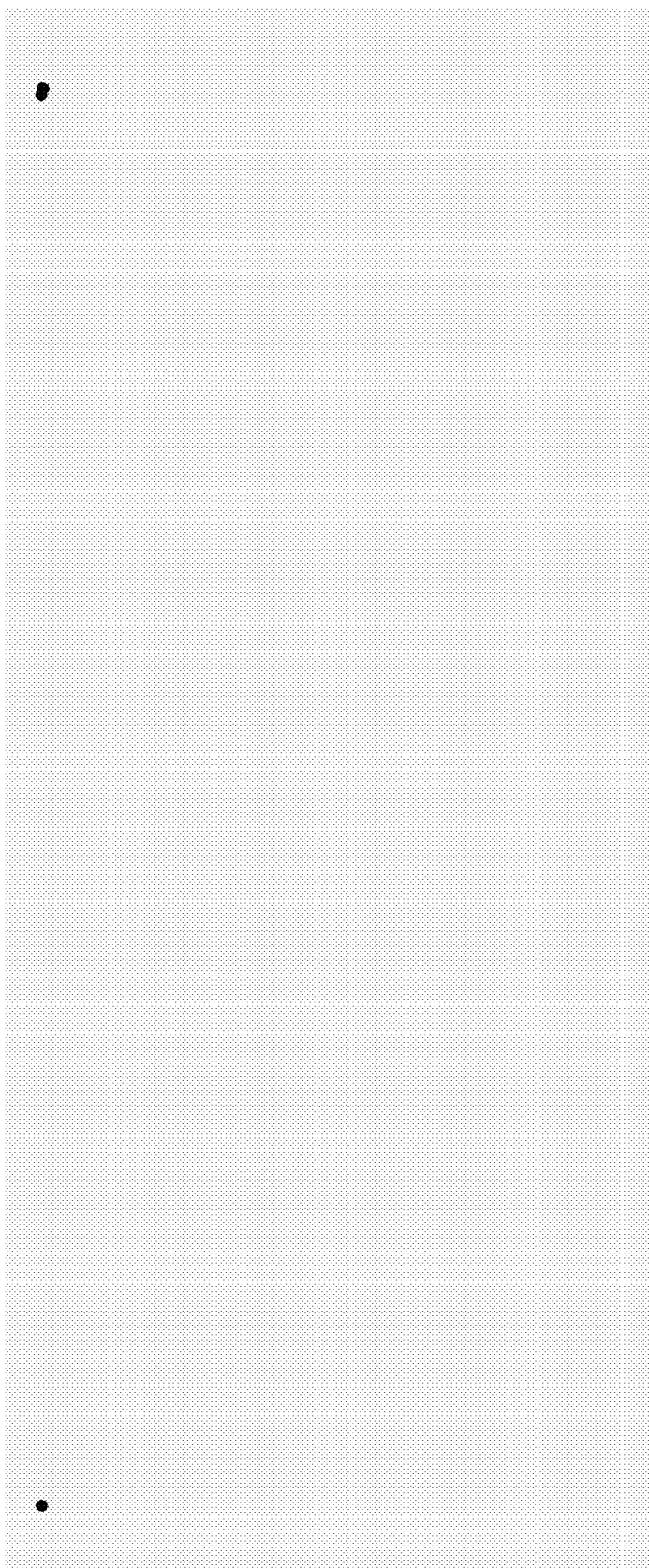
Figure 10D:
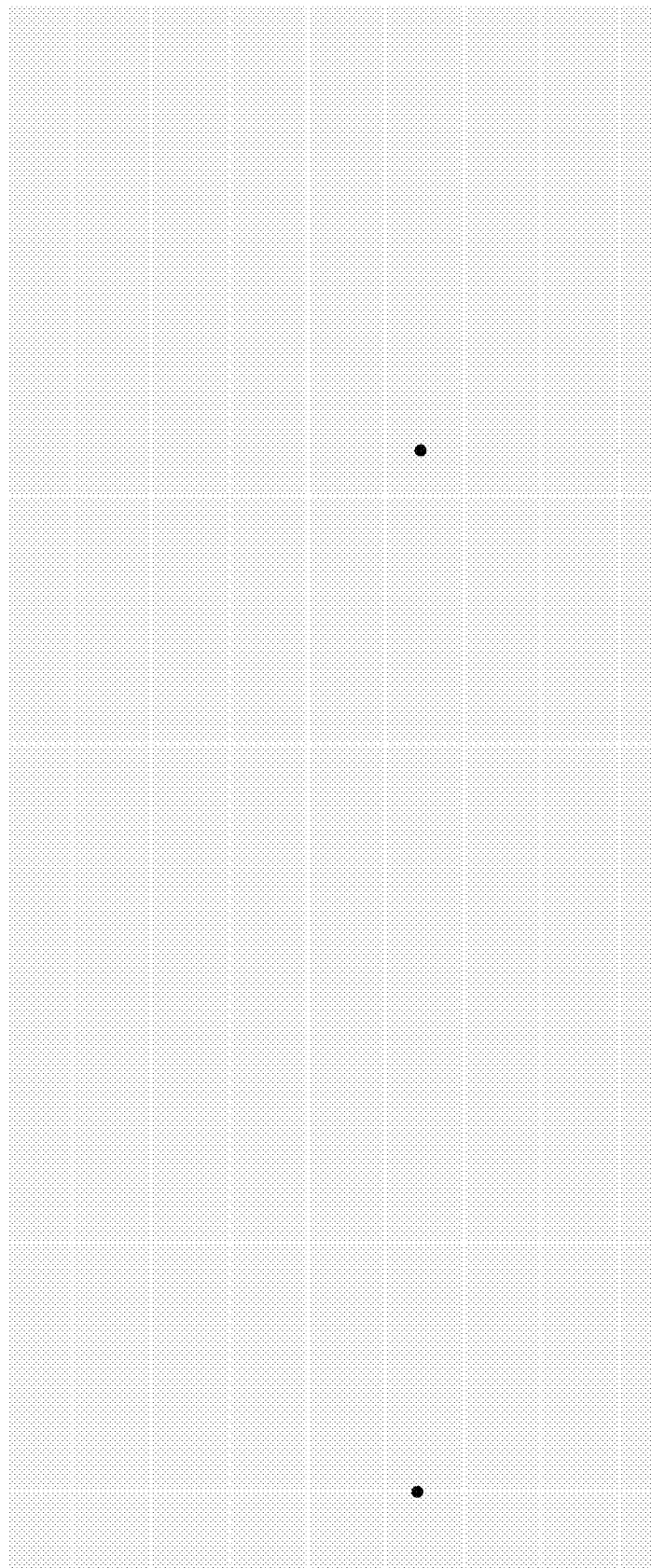

Referring to FIGS. 10A-10D, a pair of test parameter variable values is shown for different iterations using the existing method to determine new test configurations each iteration in accordance with an illustrative embodiment. FIG. 10A shows a first iteration. FIG. 10B shows a tenth iteration. The test parameter values are collapsing to a small range of values. FIG. 10C shows a nineteenth iteration. The test parameter values are collapsing to two very small ranges of values. FIG. 10D shows a twenty-ninth iteration. The test parameter values are collapsing to two essentially two paired values.

Figure 11A:
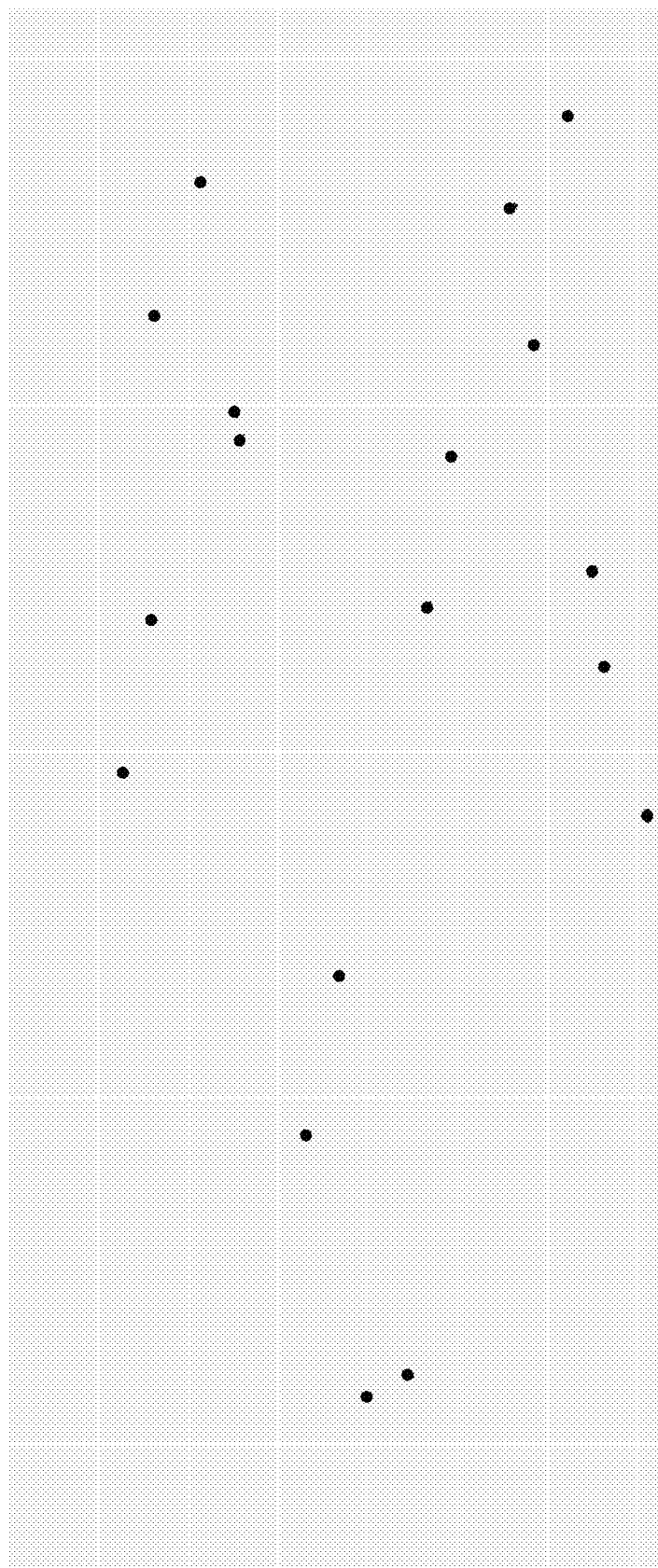
FIGS. 11A-11D show paired variable values for different iterations determined using the test system of FIG. 1 using the new method in accordance with an illustrative embodiment.
Figure 11B:
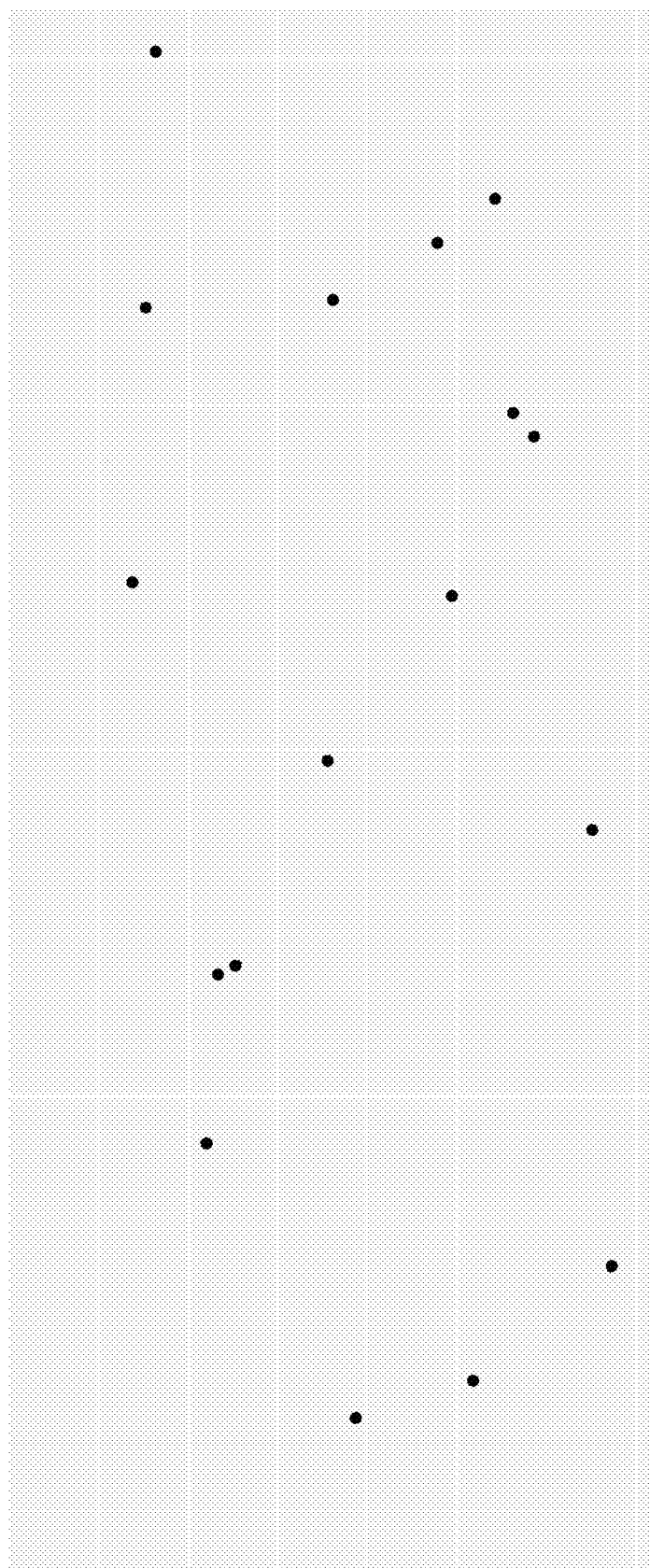
Figure 11C:
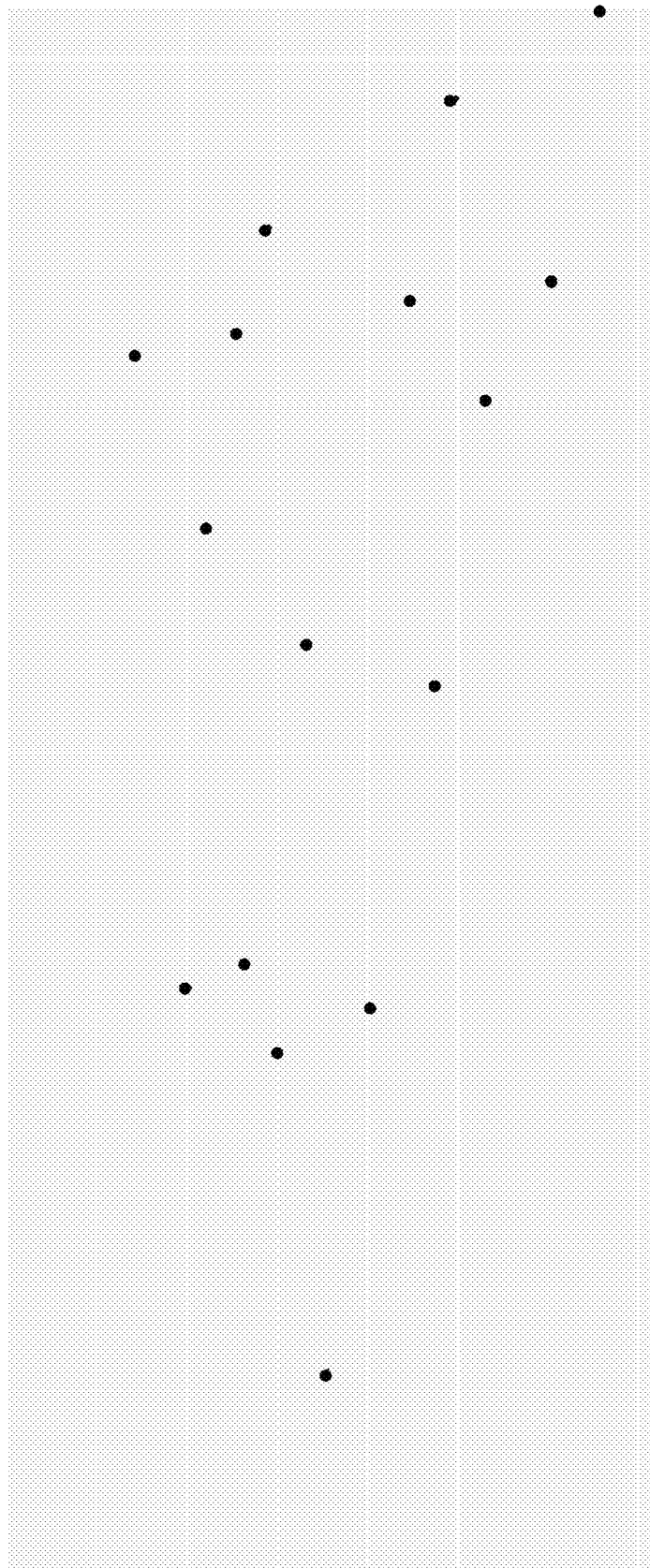
Figure 11D:
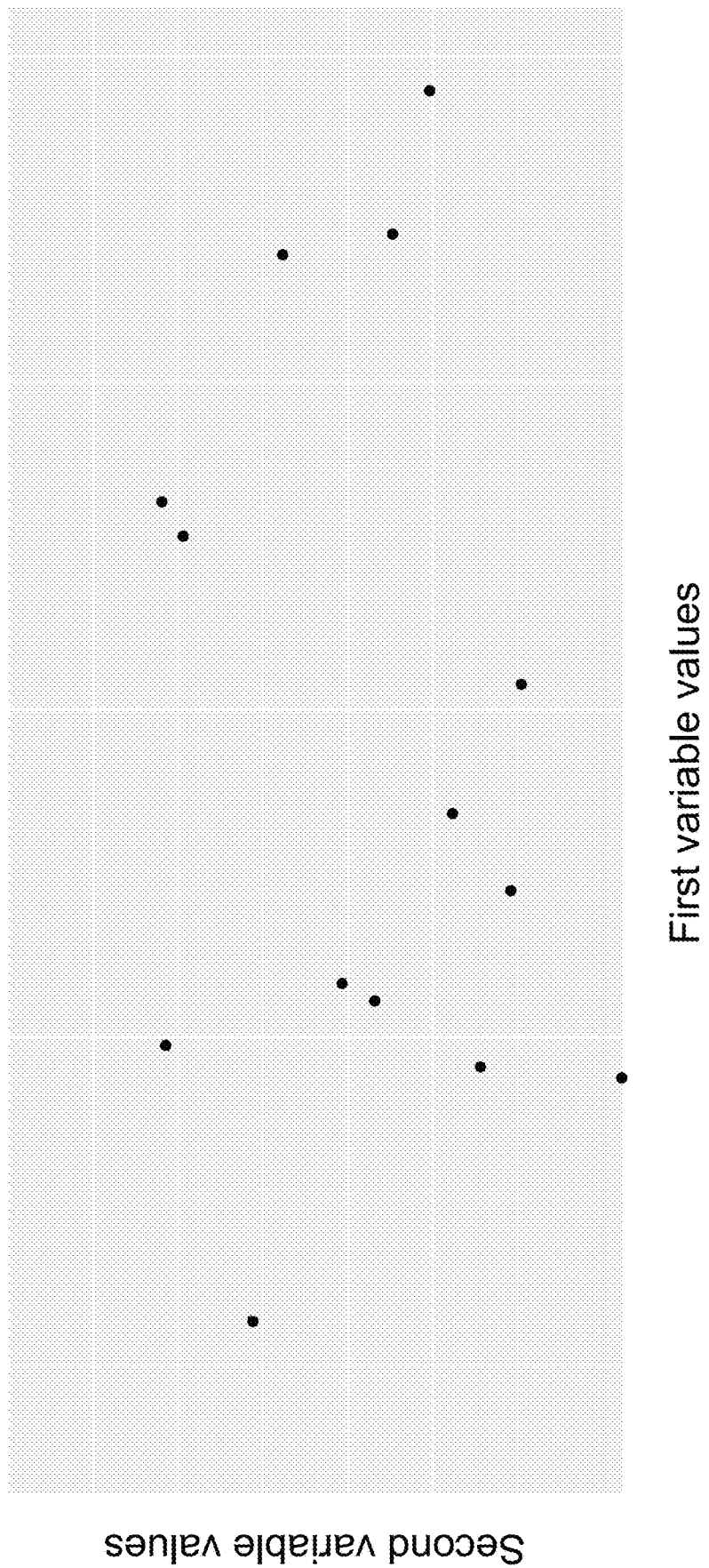

Referring to FIGS. 11A-11D, the pair of test parameter variable values are shown for different iterations using test execution manager application 312, with restart, non-mutation of nominal variables, and a more random version of LHS to generate the initial test configurations in accordance with an illustrative embodiment. FIG. 11A shows a first iteration. FIG. 11B shows a ninth iteration. FIG. 11C shows a nineteenth iteration. FIG. 11D shows a twenty-ninth iteration. The test parameter values remain well-distributed to provide an improved search of the test parameter values to identify more errors and/or instances of degraded performance.

Figure 12A:
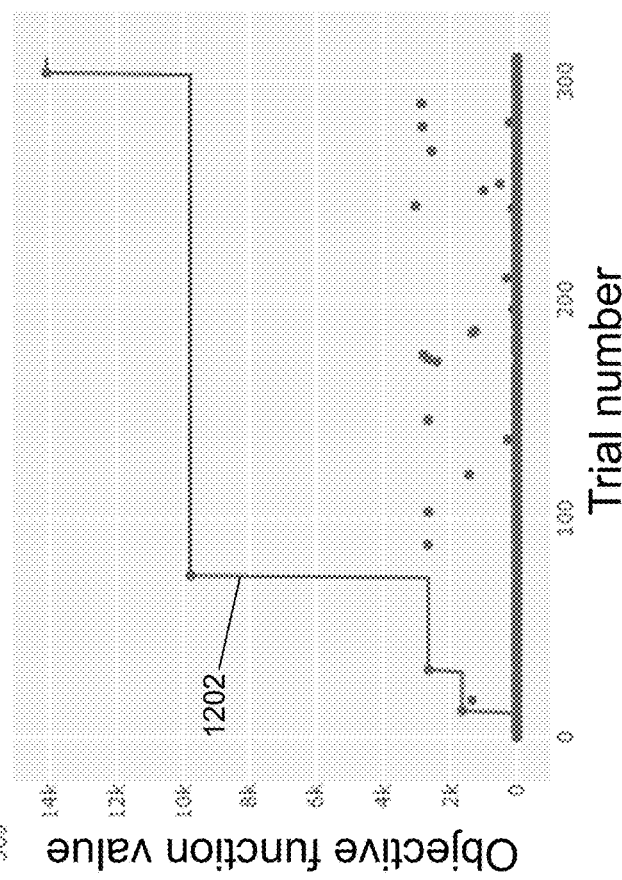
FIG. 12A shows an objective function value using the existing method in accordance with an illustrative embodiment.

Referring to FIG. 12A, an objective function value for different trial numbers is shown that was computed using an existing method in accordance with an illustrative embodiment. The different trial numbers are the different test configurations that were evaluated each iteration. A first curve 1200 shows the best objective function value as a function of the trial number.

Figure 12B:
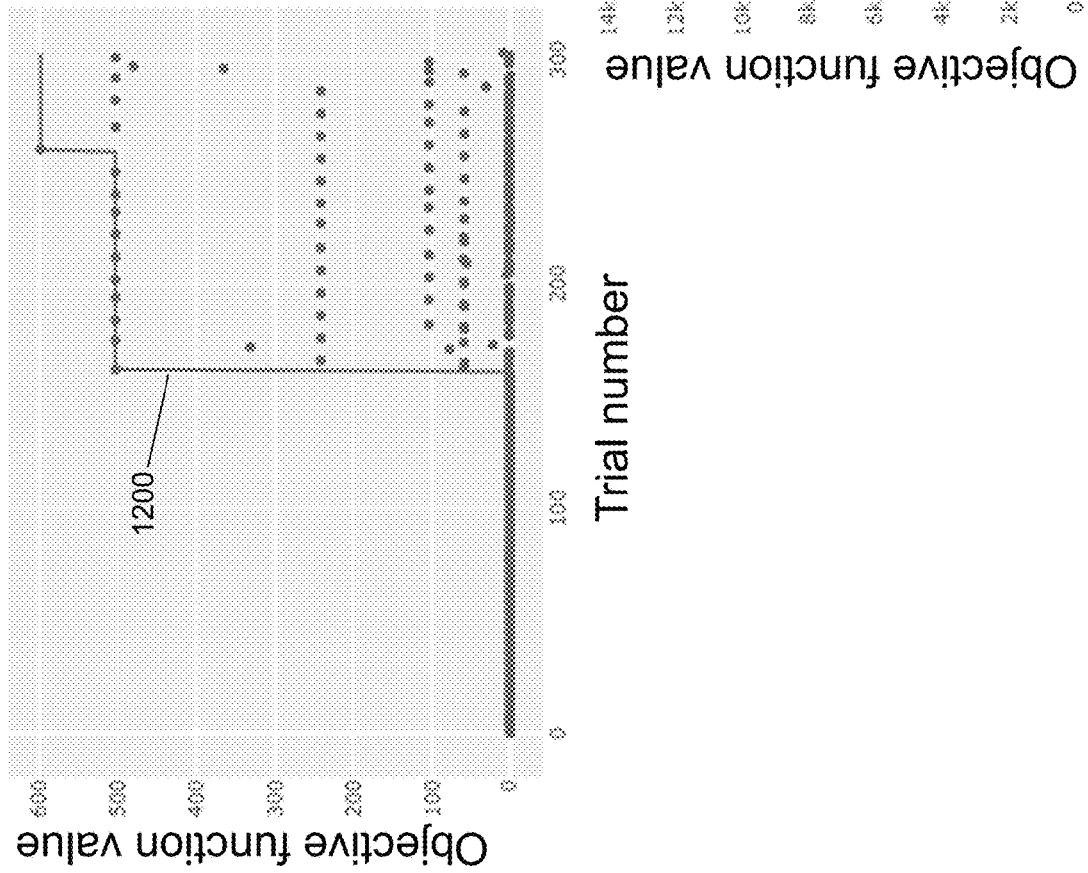
FIG. 12B shows an objective function value computed using the test system of FIG. 1 for different trial numbers using a new method in accordance with an illustrative embodiment.

Referring to FIG. 12B, an objective function value for different trial numbers is shown that was computed using test execution manager application 312, with restart, non-mutation of nominal variables, and a more random version of LHS to generate the initial test configurations in accordance with an illustrative embodiment. A second curve 1202 shows the best objective function value as a function of the trial number. The best objective function value is much greater with far fewer trials meaning that more errors and/or instances of degraded performance have been identified more quickly for software to test 314.

Given the inherent expense of testing numerous test configurations, model test execution application 222, test execution manager application 312, model execution manager application 412, and model execution worker application 432 provide efficient distributed and parallel computing device implementations for testing software. The presented results demonstrate the improved test coverage.

Test system 100 can fully leverage a human's domain expertise and advanced analytics in identifying software bugs. Testers can specify a range of test parameter values to evaluate that may trigger bugs. Sometimes, experienced testers can identify software problems very quickly without the need for intensive tests. By integrating a human's domain expertise and advanced analytics, bugs can be caught with very few tests saving significant computational resources. Test system 100 supports better decision making by providing a system that can identify and evaluate many more test configurations in parallel by allocating the computing devices of worker system 106 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) generate a first plurality of test configurations using a random seed value, wherein each test configuration of the first plurality of test configurations includes a value for each test parameter of a plurality of test parameters, wherein each test parameter of the plurality of test parameters is an input to software under test;
   (B) execute the software under test with each test configuration of the generated first plurality of test configurations to generate a test result for each test configuration of the first plurality of test configurations;
   (C) generate a second plurality of test configurations from the first plurality of test configurations and the test result generated for each test configuration of the first plurality of test configurations;
   (D) execute the software under test with each test configuration of the generated second plurality of test configurations to generate the test result for each test configuration of the generated second plurality of test configurations;
   (E) when a restart is triggered based on a distance metric value computed between the generated second plurality of test configurations, select a next random seed value as the random seed value and repeat (A) through (F), wherein the next random seed value is different from the random seed value used in any previous iteration of (A) through (F);
   (F) when the restart is not triggered based on the distance metric value computed between the generated second plurality of test configurations, repeat (C) through (F) until a stop criterion is satisfied; and
   (G) when the stop criterion is satisfied, output the generated test result for each test configuration generated in (A) and (C).

2. The non-transitory computer-readable medium of claim 1, wherein the stop criterion is a number of iterations of (A) and (C), wherein the stop criterion is satisfied when the number of iterations of (A) and (C) is greater than a predefined maximum number of iterations.

3. The non-transitory computer-readable medium of claim 1, wherein each test configuration generated in (C) has a distance from each test configuration generated in (A) that is greater than a predefined cache tolerance value.

4. The non-transitory computer-readable medium of claim 1, wherein after (F), the computer-readable instructions further cause the computing device to:
   determine an importance value for each test parameter of the plurality of test parameters using a predictive model trained using each test configuration generated in (A) and (C) in association with the test result generated for each respective test configuration; and
   output the determined importance value for each test parameter of the plurality of test parameters.

5. The non-transitory computer-readable medium of claim 1, wherein in (A), the first plurality of test configurations is generated based on random selection of a value for each test parameter of the plurality of test parameters, wherein the value is selected between a minimum value and a maximum value defined for each test parameter of the plurality of test parameters.

6. The non-transitory computer-readable medium of claim 1, wherein in (A), the first plurality of test configurations is generated using Latin hypercube sampling with the random seed value.

7. The non-transitory computer-readable medium of claim 1, wherein in (C), the second plurality of test configurations is generated using a genetic algorithm to mutate the first plurality of test configurations.

8. The non-transitory computer-readable medium of claim 7, wherein after (B) and before (C), a best plurality of test configurations is selected from the first plurality of test configurations based on the generated test result having extremum values relative to remaining test configurations of the first plurality of test configurations.

9. The non-transitory computer-readable medium of claim 8, wherein a predefined number of test configurations are selected as the best plurality of test configurations.

10. The non-transitory computer-readable medium of claim 7, wherein each test parameter of the plurality of test parameters having a nominal variable type is not mutated, wherein each test parameter of the plurality of test parameters having the nominal variable type is randomly selected from discrete values for each respective test parameter having the nominal variable type.

11. The non-transitory computer-readable medium of claim 1, wherein after (D) and before (E), the computer-readable instructions further cause the computing device to:
   generate a third plurality of test configurations from the second plurality of test configurations and the test result generated for each test configuration of the second plurality of test configurations; and
   execute the software under test with each test configuration of the generated third plurality of test configurations to generate a test result for each test configuration of the first plurality of test configurations.

12. The non-transitory computer-readable medium of claim 11, wherein the third plurality of test configurations is generated using a generating set search algorithm that defines a local population of test configurations relative to highest ranked test configurations of the second plurality of test configurations.

13. The non-transitory computer-readable medium of claim 12, wherein the distance metric value is computed from a distance matrix, wherein the distance matrix includes a Euclidean distance value computed between each pair of test configurations included in the second plurality of test configurations and the third plurality of test configurations.

14. The non-transitory computer-readable medium of claim 1, wherein in (B), the software under test is executed in parallel using a plurality of sessions, wherein each session of the plurality of sessions is assigned a different test configuration of the first plurality of test configurations.

15. The non-transitory computer-readable medium of claim 14, wherein each session of the plurality of sessions includes a plurality of worker computing devices.

16. The non-transitory computer-readable medium of claim 15, wherein in (B), the software under test is executed with a test dataset input to the software under test, wherein the test dataset is distributed across the plurality of worker computing devices of each session of the plurality of sessions.

17. The non-transitory computer-readable medium of claim 1, wherein in (D), the software under test is executed in parallel using a plurality of sessions, wherein each session of the plurality of sessions is assigned a different test configuration of the second plurality of test configurations.

18. The non-transitory computer-readable medium of claim 17, wherein each session of the plurality of sessions includes a plurality of worker computing devices.

19. The non-transitory computer-readable medium of claim 18, wherein in (D), the software under test is executed with a test dataset input to the software under test, wherein the test dataset is distributed across the plurality of worker computing devices of each session of the plurality of sessions.

20. The non-transitory computer-readable medium of claim 1, wherein the generated test result indicates whether execution of the software under test with a respective test configuration failed due to an error.

21. The non-transitory computer-readable medium of claim 1, wherein the generated test result indicates a memory consumption by the software under test with a respective test configuration.

22. The non-transitory computer-readable medium of claim 1, wherein the generated test result indicates an execution time required by the software under test with a respective test configuration.

23. The non-transitory computer-readable medium of claim 1, wherein the distance metric value is computed from a distance matrix, wherein the distance matrix includes a Euclidean distance value computed between each pair of test configurations included in the second plurality of test configurations.

24. The non-transitory computer-readable medium of claim 23, wherein the Euclidean distance value is computed after normalizing each test configuration included in the second plurality of test configurations.

25. The non-transitory computer-readable medium of claim 23, wherein the distance metric value is computed using $d\mathrel{+}=e^{(-D[i]/N_T)}$, $i=1, \ldots, n_{up}*n_{up}$, where d indicates the distance metric value, D indicates the distance matrix, e indicates an exponent value, $N_T$ indicates a number of test parameters included in each test configuration, and $n_{up}$ indicates a number of test configurations included in the generated second plurality of test configurations.

26. The non-transitory computer-readable medium of claim 25, wherein the distance metric value is further computed using $d=d/(n_{up}*(n_{up}-1))$.

27. The non-transitory computer-readable medium of claim 1, wherein the restart is triggered when the distance metric value is less than or equal to a predefined restart threshold value.

28. The non-transitory computer-readable medium of claim 1, wherein the restart is not triggered when the distance metric value is greater than or equal to a predefined restart threshold value.

29. A computing device comprising:
a processor; and
a computer-readable medium operably coupled to the processor, the computer-readable medium having computer-readable instructions stored thereon that, when executed by the processor, cause the computing device to
(A) generate a first plurality of test configurations using a random seed value, wherein each test configuration of the first plurality of test configurations includes a value for each test parameter of a plurality of test parameters, wherein each test parameter of the plurality of test parameters is an input to software under test;
(B) execute the software under test with each test configuration of the generated first plurality of test configurations to generate a test result for each test configuration of the first plurality of test configurations;
(C) generate a second plurality of test configurations from the first plurality of test configurations and the test result generated for each test configuration of the first plurality of test configurations;
(D) execute the software under test with each test configuration of the generated second plurality of test configurations to generate the test result for each test configuration of the generated second plurality of test configurations;
(E) when a restart is triggered based on a distance metric value computed between the generated second plurality of test configurations, select a next random seed value as the random seed value and repeat (A) through (F), wherein the next random seed value is different from the random seed value used in any previous iteration of (A) through (F);
(F) when the restart is not triggered based on the distance metric value computed using the generated second plurality of test configurations, repeat (C) through (F) until a stop criterion is satisfied; and
(G) when the stop criterion is satisfied, output the generated test result for each test configuration generated in (A) and (C).

30. A method of automatically defining new test configurations for testing software, the method comprising:
(A) generating, by a computing device, a first plurality of test configurations using a random seed value, wherein each test configuration of the first plurality of test configurations includes a value for each test parameter of a plurality of test parameters, wherein each test parameter of the plurality of test parameters is an input to software under test;
(B) executing, by the computing device, the software under test with each test configuration of the generated first plurality of test configurations to generate a test result for each test configuration of the first plurality of test configurations;
(C) generating, by the computing device, a second plurality of test configurations from the first plurality of test configurations and the test result generated for each test configuration of the first plurality of test configurations;

(D) executing, by the computing device, the software under test with each test configuration of the generated second plurality of test configurations to generate the test result for each test configuration of the generated second plurality of test configurations;

(E) when a restart is triggered based on a distance metric value computed between the generated second plurality of test configurations, selecting, by the computing device, a next random seed value as the random seed value and repeat (A) through (F), wherein the next random seed value is different from the random seed value used in any previous iteration of (A) through (F);

(F) when the restart is not triggered based on the distance metric value computed using the generated second plurality of test configurations, repeating, by the computing device, (C) through (F) until a stop criterion is satisfied; and (G) when the stop criterion is satisfied, outputting, by the computing device, the generated test result for each test configuration generated in (A) and (C).

* * * * *